US009511593B2

(12) United States Patent
Hirano et al.

(10) Patent No.: US 9,511,593 B2
(45) Date of Patent: Dec. 6, 2016

(54) LIQUID CARTRIDGE AND LIQUID-EJECTING DEVICE PROVIDED WITH THE SAME

(71) Applicants: Mikio Hirano, Okazaki (JP); Noritsugu Ito, Tokoname (JP)

(72) Inventors: Mikio Hirano, Okazaki (JP); Noritsugu Ito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 373 days.

(21) Appl. No.: 13/754,699

(22) Filed: Jan. 30, 2013

(65) Prior Publication Data

US 2013/0136522 A1 May 30, 2013

Related U.S. Application Data

(63) Continuation-in-part of application No. PCT/JP2011/066574, filed on Jul. 21, 2011.

(30) Foreign Application Priority Data

Jul. 30, 2010 (JP) ................................ 2010-173092

(51) Int. Cl.
*B41J 2/175* (2006.01)
*F16K 31/00* (2006.01)

(52) U.S. Cl.
CPC ........... *B41J 2/17513* (2013.01); *B41J 2/1752* (2013.01); *B41J 2/1753* (2013.01);
(Continued)

(58) Field of Classification Search
CPC . B41J 2/17596; B41J 2/17543; B41J 2/17559; B41J 2/17513; B41J 2/1753; B41J 2/1752; B41J 2/17553; B41J 2/17523; A01G 25/162; F16K 11/083; F16K 11/105; F16K 11/048; F16K 11/065
(Continued)

(56) References Cited

U.S. PATENT DOCUMENTS 4,076,046 A * 2/1978 Hieronymus et al. ..... 137/627.5
7,422,316 B2 * 9/2008 Shinada ......................... 347/86
(Continued)

FOREIGN PATENT DOCUMENTS

JP 2002-178535 A 6/2002
JP 2007-090731 A 4/2007

OTHER PUBLICATIONS

The International Bureau of WIPO, International Preliminary Report on Patentability for International Patent Application No. PCT/JP2011/066574 (counterpart International patent application), received Feb. 25, 2013.

*Primary Examiner* — Matthew Luu
*Assistant Examiner* — Patrick King
(74) *Attorney, Agent, or Firm* — Baker Botts L.L.P.

(57) ABSTRACT

A liquid cartridge includes a liquid accommodating unit, a delivery channel, a valve, and a locking mechanism. The liquid accommodating unit is configured to accommodate liquid. The delivery channel is configured to discharge the liquid outside. The delivery channel is in fluid communication with the liquid accommodating unit. The valve includes a valve body provided in the delivery channel. The valve body is configured to selectively move between a closed position where the delivery channel is closed and an open position where the delivery channel is open. The locking mechanism includes a locking member configured to selectively move between a locking position to prevent the valve body positioned at the closed position from moving to the open position and a disengaged position to allow the valve
(Continued)

body positioned at the closed position to move to the open position.

11 Claims, 17 Drawing Sheets

(52) U.S. Cl.
CPC ....... *B41J 2/17523* (2013.01); *B41J 2/17553* (2013.01); *B41J 2/17596* (2013.01)

(58) Field of Classification Search
USPC ............................................................ 347/86
See application file for complete search history.

(56) References Cited

U.S. PATENT DOCUMENTS

| | | | | |
|---|---|---|---|---|
| 2002/0024543 | A1* | 2/2002 | Kimura et al. | 347/7 |
| 2003/0071874 | A1* | 4/2003 | Ishizawa et al. | 347/50 |
| 2004/0199106 | A1* | 10/2004 | Landau et al. | 604/68 |
| 2005/0195246 | A1* | 9/2005 | Ogawa | 347/65 |
| 2005/0243150 | A1* | 11/2005 | Ghisalberti et al. | 347/86 |
| 2007/0081056 | A1* | 4/2007 | Ito | B41J 2/17596 347/85 |
| 2009/0237426 | A1* | 9/2009 | Kimura | 347/7 |
| 2010/0107669 | A1* | 5/2010 | Wada | 62/196.1 |
| 2011/0187772 | A1* | 8/2011 | Tomoguchi et al. | 347/7 |
| 2011/0249065 | A1* | 10/2011 | Hirano et al. | 347/86 |

* cited by examiner (a)

(b)

LIQUID CARTRIDGE AND LIQUID-EJECTING DEVICE PROVIDED WITH THE SAME

CROSS REFERENCE TO RELATED APPLICATION

This application claims priorities from Japanese Patent Application No. 2010-173092 filed Jul. 30, 2010. This application is also a continuation-in-part of International Application No. PCT/JP2011/066574 filed Jul. 21, 2011 in Japan Patent Office as a Receiving Office. The content of this application is incorporated herein by reference.

TECHNICAL FIELD

The present invention relates to a liquid cartridge, and a liquid-ejecting device provided with the liquid cartridges.

BACKGROUND

An ink cartridge described in Japanese Patent Application Publication No. 2002-178535 has an ink-delivery part attached to an end of an ink pack encapsulating ink. A packing member is fitted into an outlet of the ink-delivery part, and a valve member is urged by a spring member to contact one endface of the packing member to prevent the delivery of ink.

SUMMARY

However, with the ink cartridge described in Patent Reference 1, the valve member can separate from the packing member due to impacts or the like occurring when the ink cartridge is transported, allowing ink to leak from the ink pack.

Therefore, it is an object of the present invention to provide a liquid cartridge that can suppress leakage of a liquid accommodated therein. It is another object of the present invention to provide a liquid-ejecting device provided with the liquid cartridges.

In order to attain above and other objects, the present invention provides a liquid cartridge. The liquid cartridge includes a liquid accommodating unit, a delivery channel, a valve, and a locking mechanism. The liquid accommodating unit is configured to accommodate liquid. The delivery channel is configured to discharge the liquid outside. The delivery channel is in fluid communication with the liquid accommodating unit. The valve includes a valve body provided in the delivery channel. The valve body is configured to selectively move between a closed position where the delivery channel is closed and an open position where the delivery channel is open. The locking mechanism includes a locking member configured to selectively move between a locking position to prevent the valve body positioned at the closed position from moving to the open position and a disengaged position to allow the valve body positioned at the closed position to move to the open position.

Preferably, the valve further comprises a first urging member configured to urge the valve body from the open position toward the closed position so as to position the valve body at the closed position. The lock mechanism further comprises a second urging member configured to urge the locking member from the disengaged position toward the locking position so as to locate the locking member at the locking position.

According to another aspect, the present invention provides a liquid-ejecting device. The liquid-ejecting device includes the liquid cartridge as described above, and an ejecting body. The ejecting body is detachably mounted with the liquid cartridge and includes an ejecting unit configured to eject the liquid discharged from the delivery channel. The ejecting body includes a cartridge maintaining unit, a first moving member, and a second moving member. The cartridge maintaining unit is configured to be detachably mounted with the liquid cartridge from outside and maintains the liquid cartridge at a fully mounted position where the liquid cartridge is completely mounted in the cartridge maintaining unit. The first moving member is configured to move the locking member positioned at the locking position due to the second urging member to the disengaged position in conjunction with mounting the liquid cartridge to the cartridge maintaining unit by means of being inserted within the liquid cartridge. The second moving member is configured to move the valve body positioned at the closed position due to the first urging member to the open position by means of being inserted within the liquid cartridge which has been mounted at the fully mounted position. The first moving member is configured to be inserted within the liquid cartridge. The first moving member inserted within the liquid cartridge moves the locking member positioned at the locking position by the second urging member to the disengaged position in conjunction with mount of the liquid cartridge to the cartridge maintaining unit. The second moving member is configured to be inserted within the liquid cartridge which has been mounted at the fully mounted position. The second moving member inserted within the liquid cartridge moves the valve body positioned at the closed position by the first urging member to the open position.

According to still another aspect, the present invention provides a liquid-ejecting device. The liquid-ejecting device includes the liquid cartridge described above, and an ejecting body. The ejecting body is detachably mounted with the liquid cartridge and includes an ejecting unit configured to eject the liquid discharged from the delivery channel. The ejecting body includes a cartridge maintaining unit, a first urging member, and a second urging member. The cartridge maintaining unit is configured to be detachably mounted with the liquid cartridge from outside and maintains the liquid cartridge at a fully mounted position where the liquid cartridge is completely mounted in the cartridge maintaining unit. The stopper is configured to maintain the liquid cartridge at a midway position different from the fully mounted position. The liquid cartridge is halfway mounted on the cartridge maintaining unit at the midway position. The stopper is configured to selectively move between a restricting position where the liquid cartridge is prevented from being positioned at the full mounted position and an allowing position where the liquid cartridge is allowed to be positioned at the full mounted position. The first moving member is configured to be inserted within the liquid cartridge maintained at the midway position by the stopper. The first moving member inserted within the liquid cartridge moves the locking member positioned at the locking position by the second urging member to the disengaged position. The second moving member is configured to be inserted within the liquid cartridge. The second moving member inserted within the liquid cartridge moves the valve body positioned at the closed position by the first urging member to the open position in conjunction with the movement of the liquid cartridge from the midway position to the fully mounted position.

According to further aspect, the present invention provides a liquid-ejecting device. The liquid-ejecting device includes the liquid cartridge described above, and an ejecting body. The ejecting body is detachably mounted with the liquid cartridge and includes an ejecting unit configured to eject the liquid discharged from the delivery channel. The ejecting body includes a cartridge maintaining unit, a first urging member, and a second urging member. The cartridge maintaining unit is configured to be detachably mounted with the liquid cartridge from outside and maintain the liquid cartridge at a fully mounted position where the liquid cartridge is completely mounted in the cartridge maintaining unit. The first moving member is configured to be inserted within the liquid cartridge maintained at the fully mounted position. The first moving member moves the locking member positioned at the locking position by the second urging member to the disengaged position. The second moving member is configured to be inserted within the liquid cartridge maintained at the fully mounted position. The second moving member inserted within the liquid cartridge moves the valve body positioned at the closed position by the first urging member to the open position.

The first moving member is configured to move the locking member positioned at the locking position due to the second urging member to the disengaged position by means of being inserted within the liquid cartridge maintained at the fully mounted position. The second moving member is configured to move the valve body positioned at the closed position due to the first urging member to the open position by means of being inserted within the liquid cartridge which has been mounted at the fully mounted position.

BRIEF DESCRIPTION OF THE DRAWINGS

In the drawings:

FIG. 12 is a partial cross-sectional view of an ink cartridge according to a fourth modification, wherein FIG. 12 shows an operation state of a first valve where the ink cartridge is about to be mounted to a mounting unit;

FIG. 13 is a partial cross-sectional view of the ink cartridge according to the fourth modification, wherein FIG. 13 shows an operation state where the ink cartridge is about to be mounted to the mounting unit;

FIG. 14 is a partial cross-sectional view of an ink cartridge according to a fifth modification, wherein FIG. 14 shows an operation state where the ink cartridge is about to be mounted to a mounting unit;

FIG. 16 is a partial cross-sectional view of an ink cartridge according to a sixth modification, wherein FIG. 16 shows an operation state of a first and second valves where the ink cartridge is about to be mounted to a mounting unit; and FIG. 17 is a partial cross-sectional view of an ink cartridge according to a seventh modification, wherein FIG. 17 shows an operation state of a first and second valves where the ink cartridge is about to be mounted to a mounting unit

DETAILED DESCRIPTION

Next, a preferred embodiment of the present invention will be described while referring to the accompanying drawings.

Figure 1:
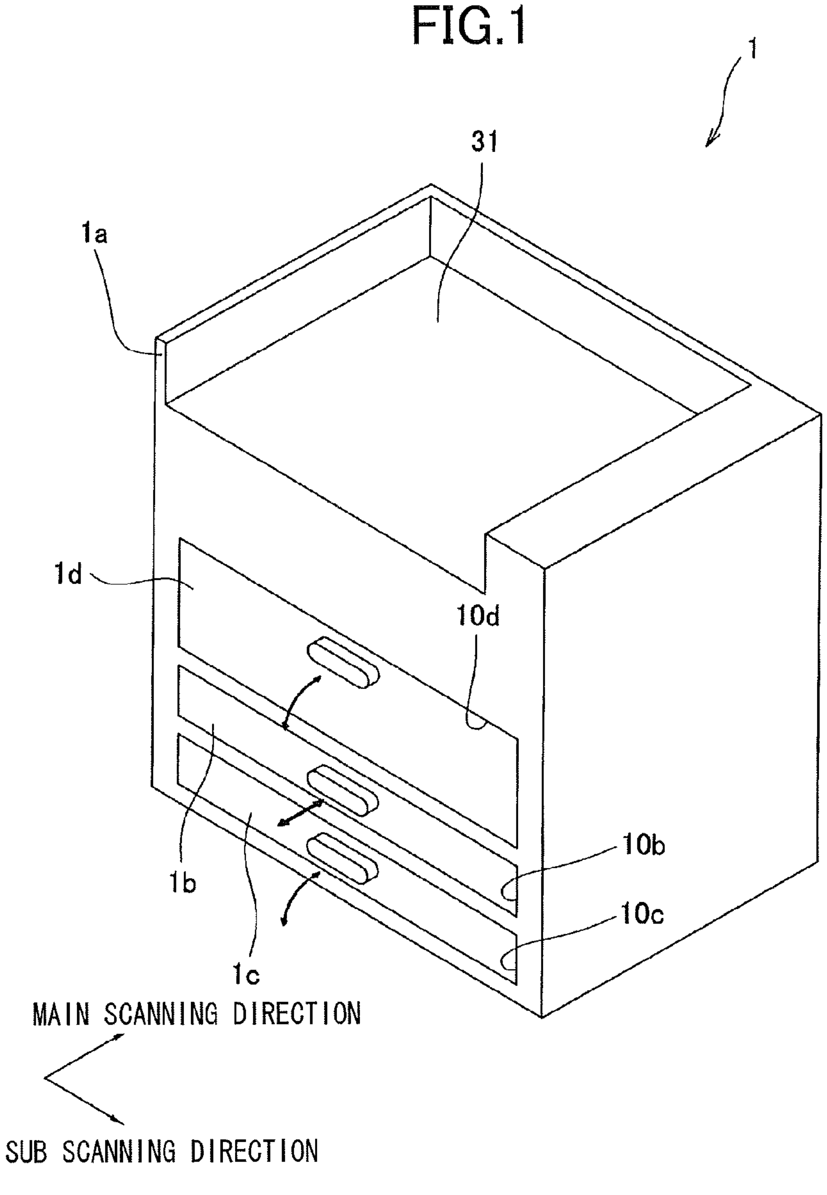
FIG. 1 is a perspective view showing the external appearance of an inkjet printer provided with an ink cartridge according to a preferred embodiment of the present invention.

FIG. 1 shows an inkjet printer 1 corresponding to the liquid-ejecting device of the present invention. The inkjet printer 1 employs ink cartridges 40 serving as a preferred embodiment of the liquid cartridges according to the invention. As shown in FIG. 1, the inkjet printer 1 has a casing 1*a* formed in the shape of a rectangular parallelepiped. Three openings 10*d*, 10*b*, and 10*c* are formed in order from top to bottom in the front surface of the casing 1*a* (the surface on the near side in FIG. 1). Doors 1*d* and 1*c* are respectively fitted into the openings 10*d* and 10*c* and are capable of pivoting open and closed about horizontal shafts provided through their bottom edges. A sheet-feeding unit 1*b* is inserted into the opening 10*b*. A paper-discharge unit 31 is provided on the top portion of the casing 1*a*. The door 1*d* is provided in the casing 1*a* at a position confronting a conveying unit 21 described later (see FIG. 2) in a main scanning direction of the inkjet printer 1 (far side in FIG. 1).

Figure 2:
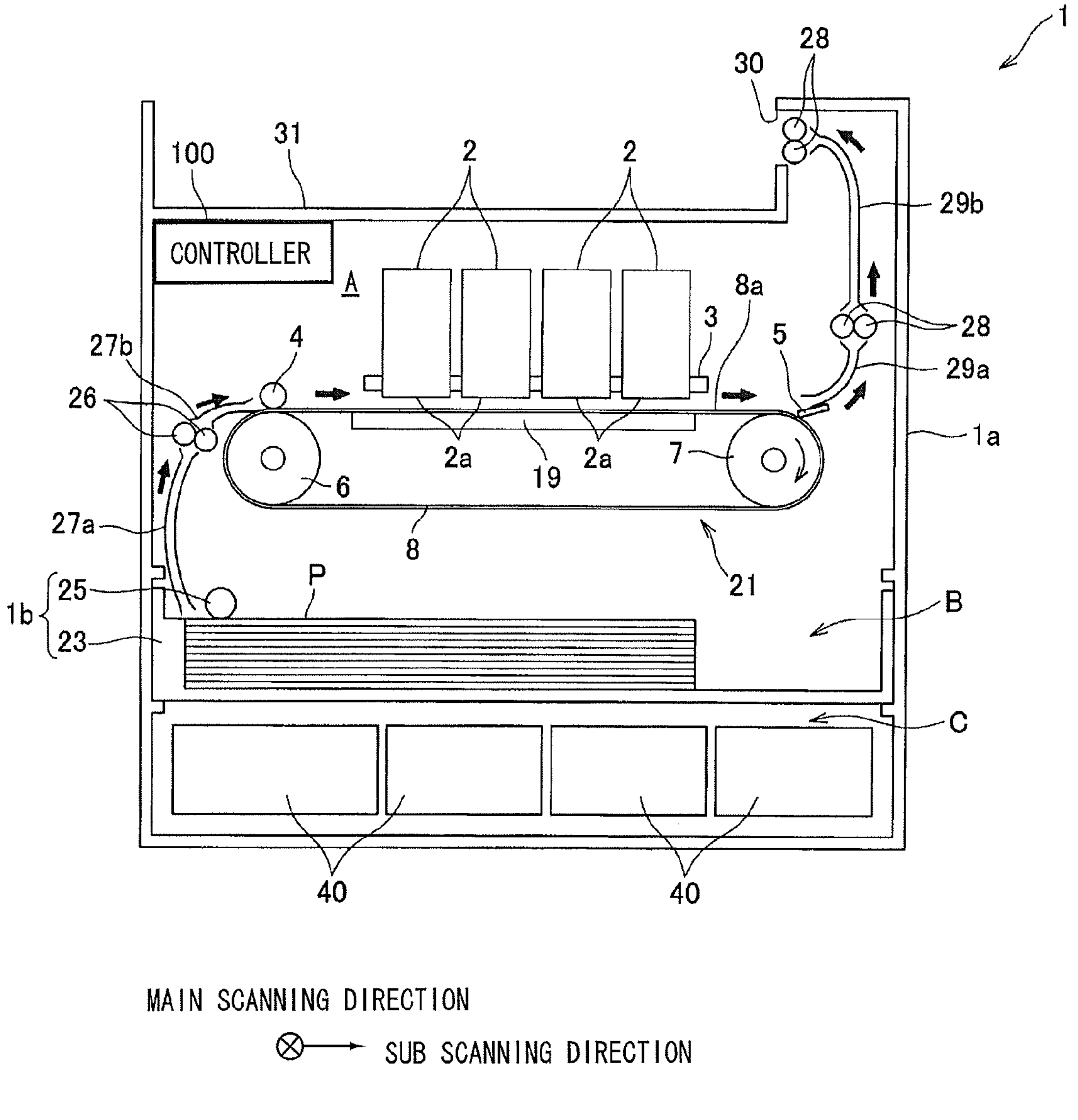
FIG. 2 is a schematic side view showing an internal structure of the inkjet printer shown in FIG. 1.

Next, the internal structure of the inkjet printer 1 will be described with reference to FIG. 2. As shown in FIG. 2, the interior of the casing 1*a* is partitioned into three spaces A, B, and C in order from top to bottom. Within the space A are disposed four inkjet heads 2 that eject ink droplets in the respective colors magenta, cyan, yellow, and black; and a conveying unit 21. The sheet-feeding unit 1*b* is disposed in the space B, and four ink cartridges 40 are disposed in the space C.

The sheet-feeding unit 1*b* and four ink cartridges 40 are mounted in and removed from the casing 1*a* along the main scanning direction (direction orthogonal to the surface of the paper in FIG. 2). In the preferred embodiment, a sub scanning direction is a direction in which a sheet P is conveyed by the conveying unit 21, while the main scanning direction is a horizontal direction orthogonal to the sub scanning direction. The inkjet printer 1 is further provided with a controller 100 (see FIG. 11) that controls the sheet-feeding unit 1*b*, the conveying unit 21, the inkjet heads 2, and the like.

As indicated by the bold arrows in FIG. 2, a paper-conveying path is also formed in the inkjet printer 1 for guiding sheets P conveyed from the sheet-feeding unit 1*b* to the paper-discharge unit 31. The sheet-feeding unit 1*b* includes a paper tray 23 for accommodating a plurality of sheets P, and a feeding roller 25 mounted in the paper tray 23. The feeding roller 25 is driven to rotate by a feeding motor (not shown) under control of the controller 100 in order to feed the topmost sheet P in the paper tray 23. A sheet P fed by the feeding roller 25 is guided along guides 27*a* and 27*b*, and a pair of conveying rollers 26 grip and convey the sheet P to the conveying unit 21.

As shown in FIG. 2, the conveying unit 21 includes two belt rollers 6 and 7 and an endless conveying belt 8 mounted around the belt rollers 6 and 7 and stretched therebetween. The belt roller 7 is the drive roller. A conveying motor (not shown) applies a drive force to the belt roller 7 under control of the controller 100 to rotate the belt roller 7 clockwise in FIG. 2. The belt roller 6 is a follow roller that rotates clockwise in FIG. 2 when the conveying belt 8 is circulated by the rotating belt roller 7.

An outer surface 8*a* of the conveying belt 8 is coated with silicone to give the surface tackiness. A nip roller 4 is disposed along the paper-conveying path at a position confronting the belt roller 6 through the conveying belt 8. The nip roller 4 holds the sheets P conveyed from the paper supply unit 1*b* against the outer surface 8*a* of the conveying belt 8. Once pressed against the outer surface 8*a*, the sheet P is conveyed rightward in FIG. 2 (in the paper-conveying direction) while being held on the outer surface 8*a* by the tacky coating.

A separating plate 5 is also disposed on the paper-conveying path at a position opposing the belt roller 7 through the conveying belt 8. The separating plate 5 functions to separate the sheets P from the outer surface 8*a* of the conveying belt 8. Once separated, the sheet P is guided toward pairs of conveying rollers 28 by guides 29*a* and 29*b*, and the conveying rollers 28 grip and discharge the sheet P onto the paper-discharge unit 31 through an opening 30 formed in the top of the casing 1*a*. A feeding motor (not shown) controlled by the controller 100 applies a drive force to one of the conveying rollers 28 in each pair.

The four inkjet heads 2 are supported in the casing 1*a* by means of a frame 3 and are juxtaposed in the sub scanning direction with their axes oriented in the main scanning direction. In other words, the inkjet printer 1 of the preferred embodiment is a line-type color inkjet printer. The bottom surface of each inkjet head 2 is an ejection surface 2*a*. A plurality of ejection holes (not shown) for ejecting ink droplets is formed in each ejection surface 2*a*. A flexible tube (not shown) is connected to each inkjet head 2 and communicates with an ink channel formed therein. More specifically, the tube is connected to an ink-supply channel 154 described later with reference to FIG. 6.

A platen 19 having a substantially rectangular parallelepiped shape is disposed within the loop of the conveying belt 8 at a position confronting the four inkjet heads 2. The top surface of the platen 19 contacts the inner surface of the conveying belt 8 on the upper portion of the loop and supports this upper loop portion from the inside. Accordingly, the outer surface 8*a* on the upper loop portion of the conveying belt 8 is maintained parallel and opposite the ejection surfaces 2*a*, with a slight gap formed between the ejection surfaces 2*a* and the outer surface 8*a*. This gap constitutes part of the paper-conveying path. As a sheet P held on the outer surface 8*a* of the conveying belt 8 is conveyed directly beneath the four inkjet heads 2 in sequence, the inkjet heads 2 are controlled by the controller 100 to eject ink droplets of their respective colors onto the top surface of the sheet P, thereby forming a desired color image on the sheet P.

Of the four ink cartridges 40, the leftmost ink cartridge 40 shown in FIG. 2 stores black ink, while the remaining three ink cartridges 40 store ink in the colors magenta, cyan, and yellow, respectively. As shown in FIG. 2, the leftmost ink cartridge 40 has a larger dimension in the sub scanning direction than the other three ink cartridges 40 and, hence, a greater ink capacity than the other three ink cartridges 40. The remaining three ink cartridges 40 possess identical ink capacities. When mounted in the body of the inkjet printer 1 (casing 1*a*; hereinafter also simply called the "printer body"), each of the four ink cartridges 40 is connected to an ink-supply channel 154 linked to the corresponding inkjet head 2 for supplying ink to the inkjet head 2.

To replace one of the ink cartridges 40, the operator opens the door 1*c* on the casing 1*a*, removes the ink cartridge 40 from the printer body, and mounts a new ink cartridge 40 in the printer body. Although the ink cartridges 40 are mounted individually in the printer body in the preferred embodiment, the four ink cartridges 40 may instead be placed in a single cartridge tray to form an ink unit, and the entire ink unit may be mounted in the printer body.

Figure 3:
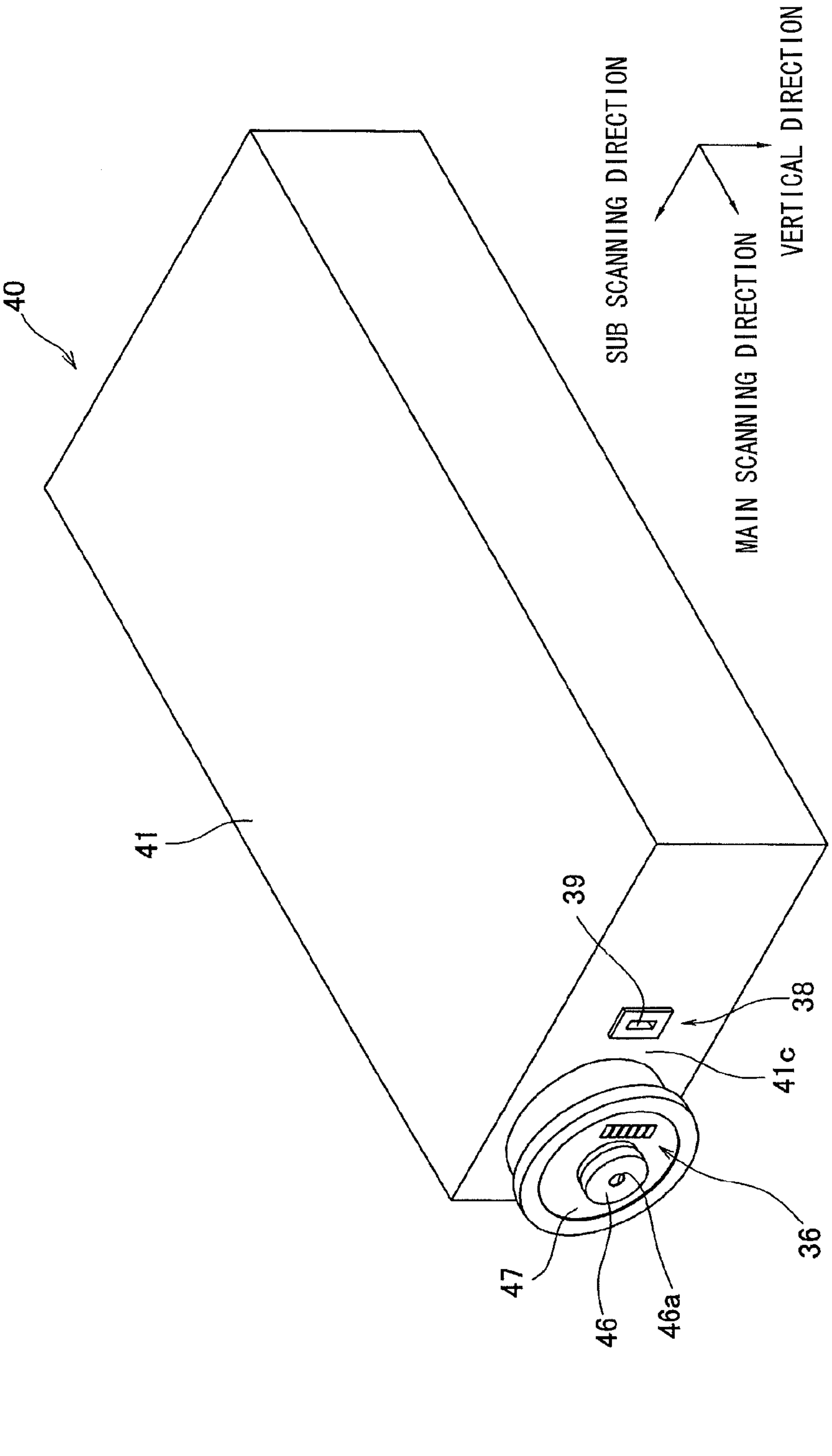
FIG. 3 is a perspective view of the ink cartridge according to the preferred embodiment of the present invention.
Figure 4:
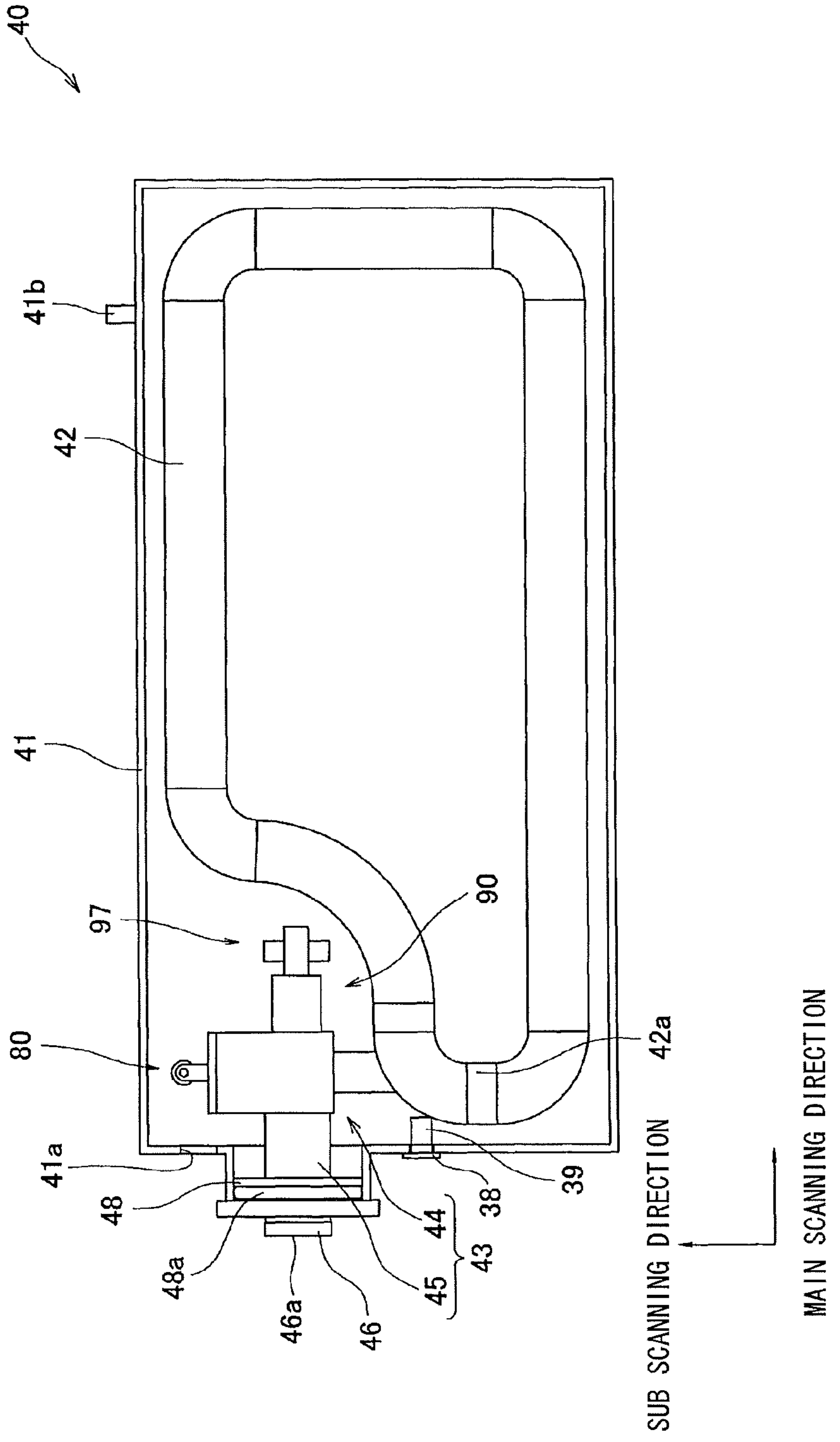
FIG. 4 is a configuration view of an internal structure of the ink cartridge shown in FIG. 3.

Next, the ink cartridges 40 will be described with reference to FIGS. 3 through 5 and FIG. 11. Note that the bold lines in FIG. 11 indicate power supply lines, while the normal lines indicate signal lines. As shown in FIGS. 3 and 4, each ink cartridge 40 includes a case 41 having a substantially rectangular parallelepiped shape, an ink bag 42 that is filled with ink and provided inside the case 41, an ink-delivery tube 43 in communication with the ink bag 42 on one end, a first valve 50 (see FIG. 5), and a second valve 60 (see FIG. 5). The ink bag 42 has a projecting part 42*a* that projects leftward in the lower-left region of FIG. 4. One end of the ink-delivery tube 43 is connected to this projecting part 42*a*.

As mentioned earlier, the ink cartridge 40 for accommodating black ink is larger in size and has greater ink storage capacity than the other three ink cartridges 40, but this difference is simply reflected in the case 41 and ink bag 42 being larger in the sub scanning direction. Since the four ink cartridges 40 have essentially the same structure, the following description of the ink cartridge 40 will pertain to all ink cartridges 40.

Figure 5:
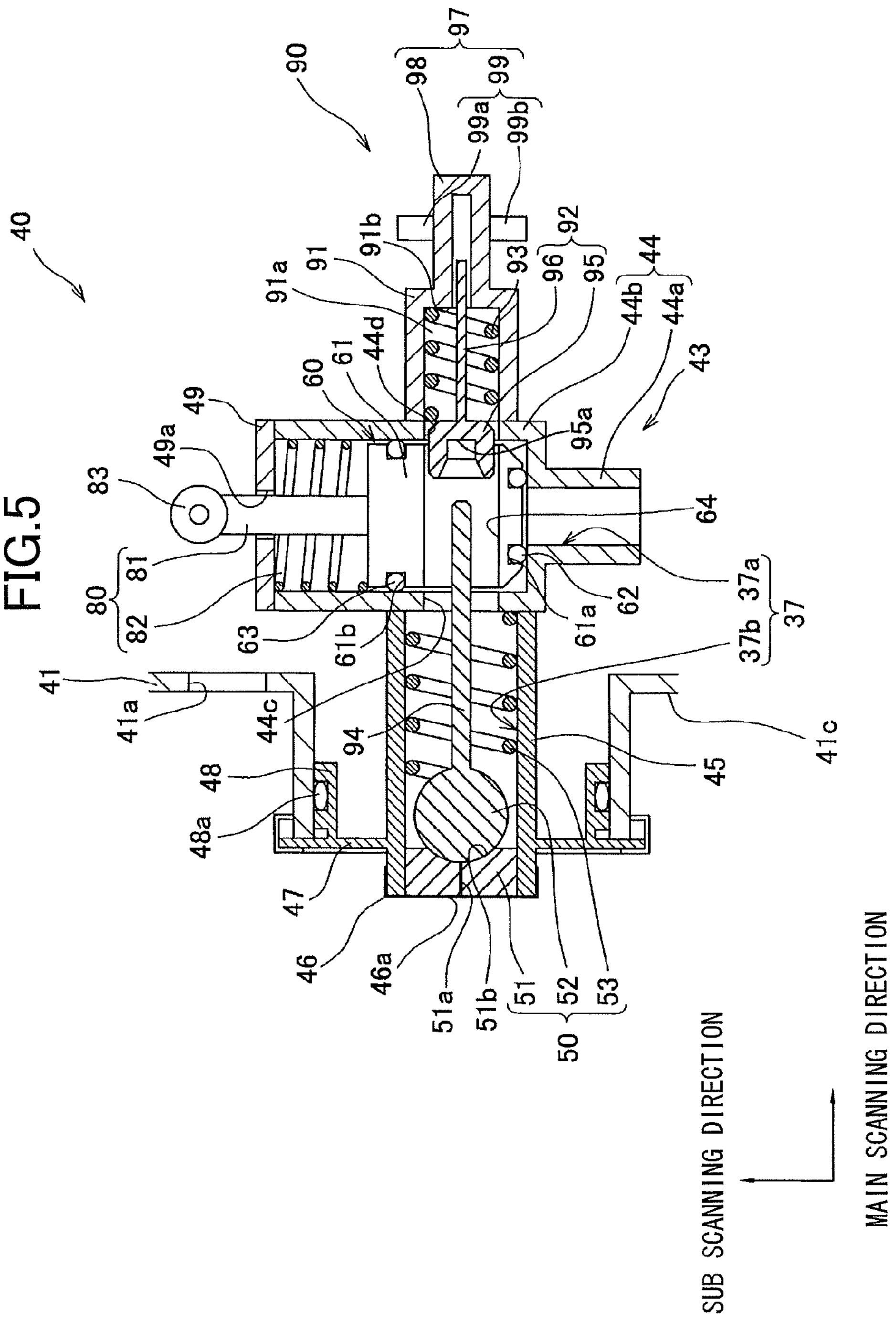
FIG. 5 is a partial cross-sectional view of the ink cartridge.

As shown in FIGS. 4 and 5, the ink-delivery tube 43 includes a tube 44 connected to the ink bag 42, and a tube 45 connected to the tube 44. As shown in FIG. 5, the tube 44 has a small diameter section 44*a*, and a large diameter section 44*b* having a larger inner diameter than that of the small diameter section 44*a*. An ink channel 37*a* is formed inside the tube 44 and extends in the sub scanning direction. A cap 49 is provided on one end of the tube 44 with respect to the sub scanning direction (the top end in FIG. 5). Two communication holes 44*c* and 44*d* are formed in the large diameter section 44*b* of the tube 44. The communication holes 44*c* and 44*d* are formed in respective side walls of the large diameter section 44*b* that oppose each other in the main scanning direction.

An ink channel 37*b* is formed in the tube 45 and extends in the main scanning direction. The right end of the tube 45 in FIG. 5 is connected to the large diameter section 44*b* so that the ink channel 37*b* and ink channel 37*a* are in fluid communication with each other via the communication hole 44*c*. The ink channels 37*a* and 37*b* are in communication and constitute a channel 37 formed in the ink-delivery tube 43.

As shown in FIG. 5, the first valve 50 is disposed inside the tube 45 of the ink-delivery tube 43. The first valve 50 includes a sealing member 51 for sealing the opening formed in the left end of the tube 45, a spherical member 52, and a coil spring 53. A cover 46 is provided over one end of the tube 45 for preventing the sealing member 51 from coming out of the tube 45. An ink outlet 46*a* is formed in the cover 46.

One end of the coil spring 53 contacts the spherical member 52, and the other end contacts the side surface of the large diameter section 44*b* for constantly urging the spherical member 52 toward the sealing member 51. In the preferred embodiment, the coil spring 53 is used as an urging member, but the urging member may be implemented by means other than a coil spring, provided that the spherical member 52 is urged toward the sealing member 51.

The sealing member 51 is configured of an elastic member formed of rubber or the like. The sealing member 51 has a slit 51*a*, and a curved part 51*b*. The slit 51*a* penetrates the center of the sealing member 51 in the main scanning direction. The curved part 51*b* constitutes the surface of the sealing member 51 that opposes the spherical member 52 and is shaped to conform to the outer surface of the spherical member 52. The slit 51*a* is sealed through contact between the spherical member 52 and the curved part 51*b*. The cross-sectional diameter of the slit 51*a* is smaller than the diameter of a hollow needle 153 described later. Accordingly, when the hollow needle 153 is inserted into the slit 51*a*, the sealing member 51 elastically deforms so that the a inner surface of the slit 51*a* is in close contact with the outer surface of the hollow needle 153, preventing ink from leaking between the slit 51*a* and the hollow needle 153. Further, the slit 51*a* formed in the sealing member 51 facilitates insertion of the hollow needle 153 into the sealing member 51. Further, although the hollow needle 153 scrapes against the sealing member 51 when being inserted therein, shaving matter from the sealing member 51 is restricted from entering the hollow needle 153. Therefore, the shaving matter from the sealing member 51 can be prevented from entering the ink channel of the inkjet head 2.

Figure 7:
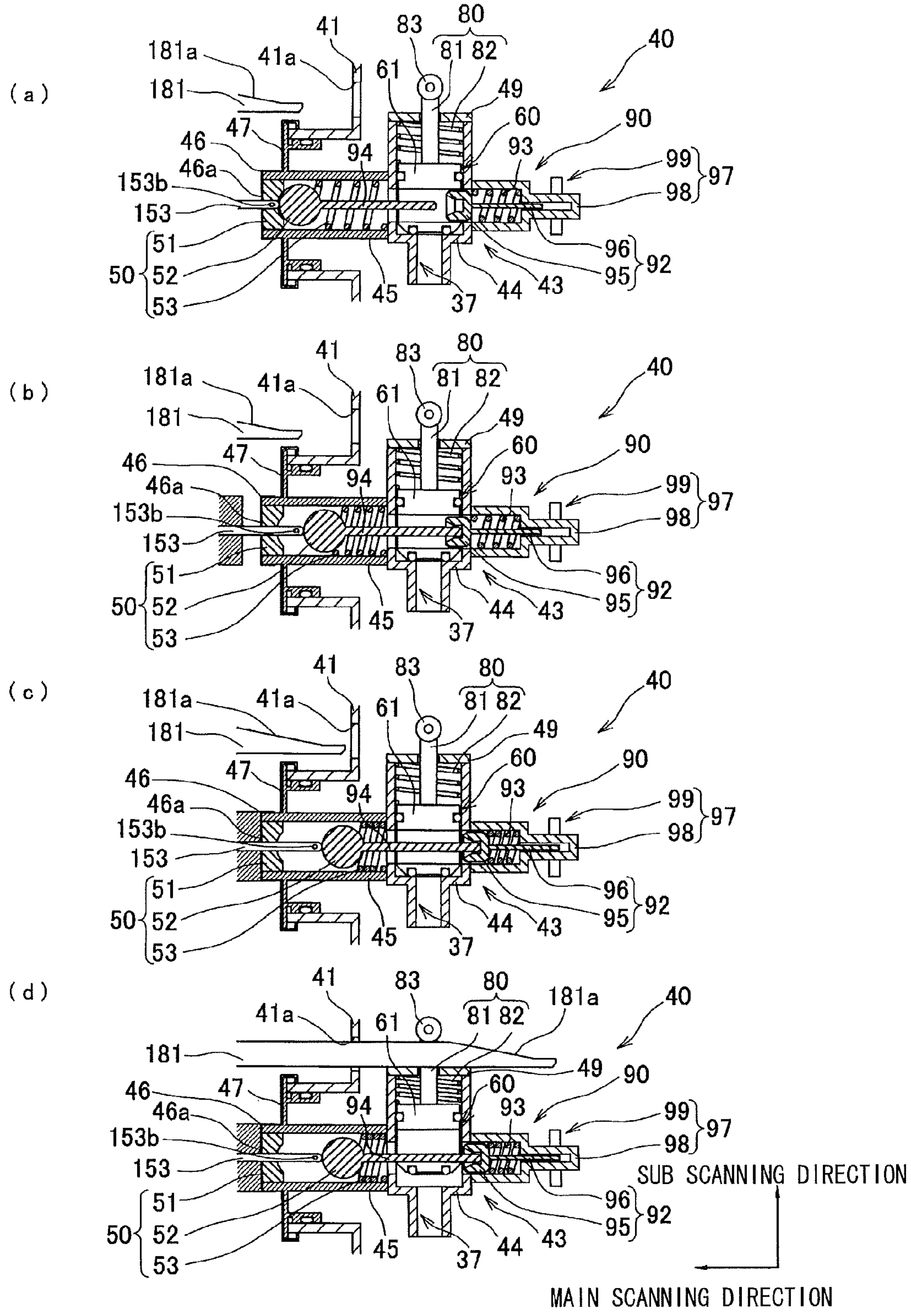
FIG. 7 is a partial cross-sectional view showing an operation state where a first and second valves become an open state from a closed state.

With this construction, when the hollow needle 153 is inserted through the ink outlet 46*a* into the slit 51*a*, as illustrated in FIGS. 7(*a*) and 7(*b*), the distal end of the hollow needle 153 contacts the spherical member 52 and pushes the spherical member 52 away from the curved part 51*b*. At this time, the first valve 50 switches from a closed state to an open state. Further, since a hole 153*b* formed in the hollow needle 153 has passed through the slit 51*a* when the first valve 50 is in the open state, the hollow needle 153 is in fluid communication with the ink channel 37*b*. Conversely, when the hollow needle 153 is extracted from the slit 51*a*, the urging force of the coil spring 53 moves the spherical member 52 toward the sealing member 51. When the spherical member 52 comes into contact with the curved part 51*b*, as illustrated in FIG. 5, the first valve 50 is shifted from the open state back to the closed state. In this way, the first valve 50 takes on either the open state for allowing communication with the ink-delivery tube 43 or the closed state for interrupting communication with the ink-delivery tube 43 based on insertion or retraction of the hollow needle 153. Further, since the first valve 50 is provided with the coil spring 53 for urging the spherical member 52 toward the sealing member 51, the first valve 50 can suppress ink from leaking out of the first valve 50 through a simple construction.

As shown in FIGS. 3 and 5, an annular flange 47 is formed near one end of the tube 45 (the left end in FIG. 5). As shown in FIGS. 4 and 5, an annular protrusion 48 is provided on the flange 47. An O-ring 48*a* is provided around the outer periphery of the annular protrusion 48 to seal the gap between the case 41 and annular protrusion 48, as shown in FIG. 5. The flange 47 of the preferred embodiment constitutes part of the side wall of the case 41.

Figure 11:
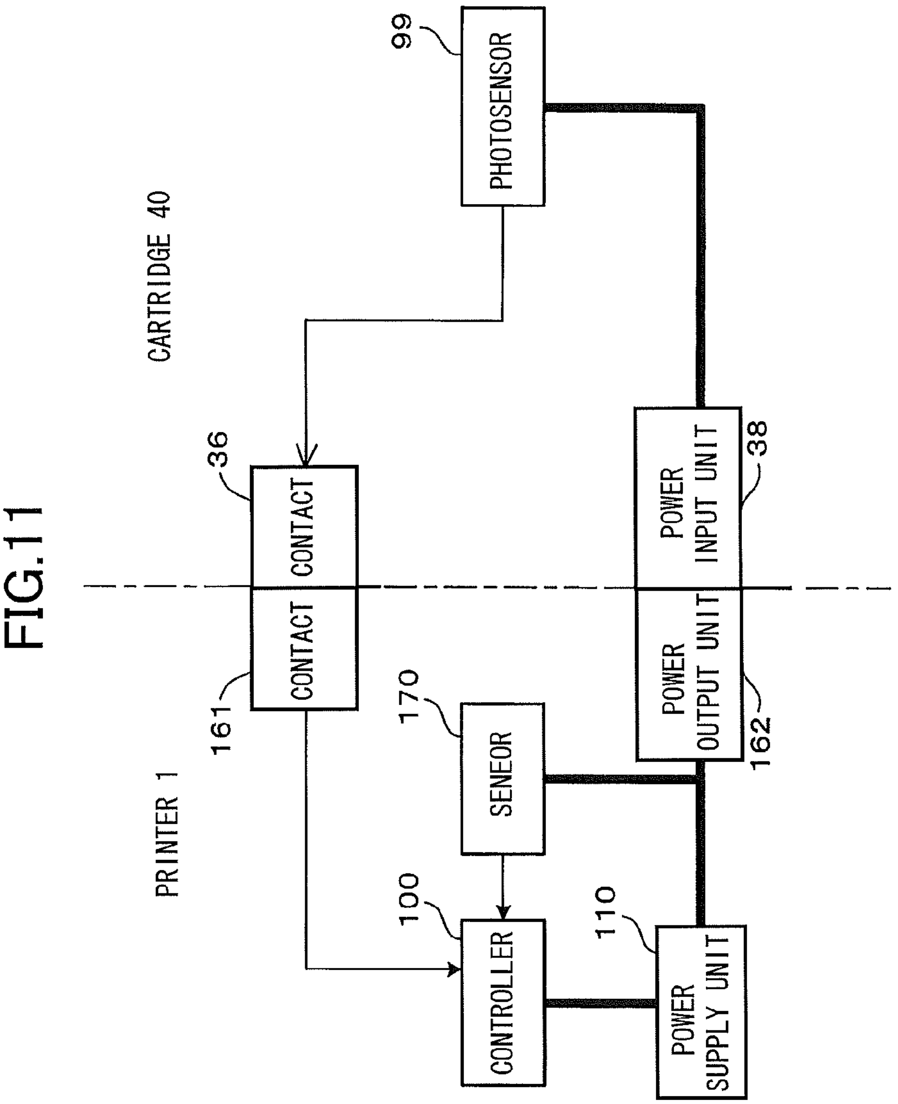
FIG. 11 is a block diagram showing an electric structure of an ink cartridge and an inkjet printer.

As indicated in FIGS. 3 and 11, a contact 36 is formed on the outer surface of the flange 47 (the ink outlet 46*a* side). The contact 36 is juxtaposed with the ink outlet 46*a* in the sub scanning direction. The contact 36 is connected to a photosensor 99 described later and transmits detection signals received from the photosensor 99 to the controller 100 via a contact 161 described later. As a variation of the embodiment, the contact 36 may be disposed at any position, provided that the contact 36 is not positioned vertically below the ink outlet 46*a*. Disposing the contact 36 of the signal transmission system at a position that is not directly beneath the ink outlet 46*a* avoids a situation in which ink drips out of the ink outlet 46*a* onto the contact 36.

As shown in FIG. 3, a power input unit 38 is disposed on the ink outlet 46*a* side of the case 41. A stepped surface 41*c* is formed on the case 41 so that the case 41 is recessed from the flange 47 toward the ink bag 42 in the main scanning direction between the ink outlet 46*a* and the power input unit 38. The power input unit 38 is provided on the stepped surface 41*c* and is separated farther from the ink outlet 46*a* in the sub scanning direction than the contact 36. As shown in FIG. 11, the power input unit 38 is electrically connected to the photosensor 99. The power input unit 38 also has a contact 39 formed as a recess that is capable of accepting insertion of a contact 163 on a power output unit 162 described later. Through an electrical connection between the contacts 39 and 163, the power input unit 38 supplies power to the photosensor 99. As a variation of the embodiment, the power input unit 38 may be disposed at any position, provided that the position is not vertically below the ink outlet 46*a*.

Disposing the power input unit 38 of the power transmission system at a position not directly below the ink outlet 46*a* in this way, prevents ink dripping out of the ink outlet 46*a* from becoming deposited on the power input unit 38. Further, by separating the power input unit 38 from the ink outlet 46*a* even farther than the contact 36, it is even less likely that ink will become deposited on the power input unit 38, thereby ensuring that the power input unit 38 does not short-circuit and damage the photosensor 99 and the like. Further, by forming the stepped surface 41*c* between the power input unit 38 and ink outlet 46*a*, the power input unit 38 and the ink outlet 46*a* are separated considerably in the main scanning direction, as well as the sub scanning direction, thereby further ensuring that ink does not become deposited on the power input unit 38.

As shown in FIG. 5, the second valve 60 includes a columnar-shaped valve member 61 disposed inside the large diameter section 44*b*, and two O-rings 62 and 63 for sealing the gap between the valve member 61 and the inner surface of the large diameter section 44*b*. A insertion hole 64 penetrates the valve member 61 in the main scanning direction. The insertion hole 64 is formed in a position opposing both the communication holes 44*c* and 44*d* and is in communication with the ink channel 37*b*. The valve member 61 has an annular groove 61*a* formed in the bottom surface of the valve member 61 in FIG. 5, and an annular groove 61*b* formed in the upper side surface of the same. The O-rings 62 and 63 are respectively provided in the annular grooves 61*a* and 61*b*.

More specifically, the annular groove 61*a* and O-ring 62 are provided in a position surrounding the portion of the bottom surface of the valve member 61 that confronts the ink channel 37*a* formed in the small diameter section 44*a*. When disposed in the closed position shown in FIG. 5, the valve member 61 interrupts communication between the ink channels 37*a* and 37*b* because the O-ring 62 is in contact with the inner surface of the large diameter section 44*b*. At this time, the second valve 60 is in the closed state. On the other hand, communication is allowed between the ink channels 37*a* and 37*b* when the valve member 61 is disposed in the open position shown in FIG. 7(*d*) because the O-ring 62 is separated from the inner surface of the large diameter section 44*b*. At this time, the second valve 60 is in the open state. Regardless of whether the valve member 61 is in the closed position or the open position, the annular groove 61*b* and the O-ring 63 are positioned closer to the cap 49 than the area of connection between the ink channels 37*a* and 37*b*. Accordingly, the area in which the ink channel 37*a* connects with the ink channel 37*b* is sealed so that this area does not communicate with space in the large diameter section 44*b* on the cap 49 side of the valve member 61.

As shown in FIGS. 4 and 5, a locking mechanism 90 is provided in the case 41 for preventing the second valve 60 from switching from the closed state to the open state. The locking mechanism 90 includes a retracting tube 91 that extends in the main scanning direction, a locking member 92, a coil spring 93, and a pressing member 94. The retracting tube 91 defines a space 91*a* for receiving the locking member 92 when the locking member 92 is retracted, and a step part 91*b* that is stepped inward so as to have a narrower interior than the space 91*a*. The retracting tube 91 is connected to the large diameter section 44*b* of the tube 44 to allow communication between the space 91*a* and channel 37 via the communication hole 44*d*. Hence, the retracting tube 91 is positioned on the side of the large diameter section 44*b* opposite the tube 45.

The locking member 92 includes a locking body 95, and a detection rod 96. A recessed part 95*a* is formed in the locking body 95 and opens toward the spherical member 52. The detection rod 96 extends from the locking body 95 in the main scanning direction. The locking member 92 can be moved from the insertion hole 64 into the space 91*a* along the main scanning direction. In other words, the locking member 92 is disposed so as to be capable of moving in a direction orthogonal to the moving direction of the valve member 61 (sub scanning direction). The coil spring 93 is disposed in the space 91*a*. One end of the coil spring 93 contacts the locking body 95, while the other end contacts the step part 91*b* of the retracting tube 91. The coil spring 93 constantly urges the locking member 92 toward the sealing body 51. The length of the coil spring 93 in the main scanning direction is sufficient for applying an urging force to the locking member 92 while the locking body 95 of the locking member 92 is in the space 91*a* and until the locking body 95 is moved to a "locking position" (the position shown in FIG. 5) spanning between the insertion hole 64 and communication hole 44*d*. When the locking body 95 is disposed in the locking position shown in FIG. 5 by the urging force of the coil spring 93 so that half of the locking body 95 is fitted in the insertion hole 64, the valve member 61 is locked, i.e., unable to move.

The pressing member 94 is a rod-shaped member formed integrally with the spherical member 52 and extends in the main scanning direction. The diameter of the pressing member 94 is smaller than the diameter of the opening in the recessed part 95*a*. The distal end of the pressing member 94 is disposed in a position confronting the back inner surface of the recessed part 95*a*. Thus, the distal end of the pressing member 94 can be inserted into the recessed part 95*a* when the spherical member 52 moves rightward in FIG. 5. The pressing member 94 has a length in the main scanning direction such that a gap is formed between the distal end of the pressing member 94 and the locking member 92 when the first valve 50 is in the closed state, and the locking body 95 is moved through the insertion hole 64 to a "disengaged position" (the position shown in FIG. 7(*c*)) on the space 91*a* side when the ink cartridge 40 is entirely mounted in a corresponding mounting unit 150 described later.

A detection unit 97 is provided in the case 41 near the retracting tube 91 for detecting when the valve member 61 has been unlocked by the locking mechanism 90. The detection unit 97 is configured of a translucent tube 98, and the photosensor 99. The translucent tube 98 is in fluid communication with the space 91*a* on one end and closed on the other end. The inner diameter of the translucent tube 98 is smaller than that of the retracting tube 91 and slightly larger than the outer diameter of the detection rod 96. The photosensor 99 detects when the detection rod 96 of the locking member 92 has been displaced from a position outside the translucent tube 98 to a position inside the same. The photosensor 99 is a transmission-type photosensor having a light-emitting unit 99*a*, and a light-receiving unit 99*b* for receiving light emitted from the light-emitting unit 99*a*. When the detection rod 96 is positioned in the translucent tube 98 between the light-emitting unit 99*a* and light-receiving unit 99*b*, light emitted by the light-emitting unit 99*a* is blocked by the detection rod 96 and, hence, not received by the light-receiving unit 99*b*. When the light-receiving unit 99*b* does not receive light, the photosensor 99 outputs a signal indicating that the light-receiving unit 99*b* is not receiving light (hereinafter referred to as a "signal A"). This signal A is transmitted to the controller 100, as indicated by the arrows in FIG. 11. On the other hand, when the detection rod 96 is not positioned between the light-emitting unit 99*a* and light-receiving unit 99*b*, the light-receiving unit 99*b* receives light emitted from the light-emitting unit 99*a* since the light emitted from the light-emitting unit 99*a* is not blocked by the detection rod 96. At this time, the photosensor 99 outputs a signal indicating that the light-receiving unit 99*b* is receiving light (hereinafter referred to as a "signal B"). The signal B is also transmitted to the controller 100. Through these signals, the controller 100 can determine whether the valve member 61 has been unlocked by the locking mechanism 90. In the preferred embodiment, the controller 100 detects that the locked state of the valve member 61 has been released by the locking mechanism 90 when receiving the signal A indicating that the light-receiving unit 99*b* is not receiving light, and detects that the valve member 61 has been placed in a locked state by the locking mechanism 90 when receiving the signal B indicating that the light-receiving unit 99*b* is receiving light. While the photosensor 99 is a transmission-type sensor in the preferred embodiment, a reflective-type sensor or a sensor other than a photosensor may be used instead.

As shown in FIGS. 4 and 5, an opening/closing mechanism 80 is provided in the case 41 for opening and closing the second valve 60. The opening/closing mechanism 80 has a rod-shaped member 81 extending in the sub scanning direction, and a coil spring 82. One end of the rod-shaped member 81 with respect to the sub scanning direction is fixed to the valve member 61, while the other end passes through an opening 49*a* formed in the cover 49 and protrudes out of the large diameter section 44*b*. The protruding end of the rod-shaped member 81 remains exposed on the outside of the large diameter section 44*b*, even when the valve member 61 is in the closed position. A roller 83 is disposed on the protruding end of the rod-shaped member 81 and is rotatably supported thereon. The coil spring 82 is provided inside the large diameter section 44*b*. One end of the coil spring 82 contacts the valve member 61, while the other end contacts the cover 49. The coil spring 82 constantly urges the valve member 61 toward the small diameter section 44*a*.

Although the coil spring 82 is employed as the urging member in the preferred embodiment, an urging member other than a coil spring may be used, provided that the member urges the valve member 61 toward the small diameter section 44*a*. An opening 41*a* is formed in the side of the case 41 nearest the ink outlet 46*a* at a position opposing the protruding end of the rod-shaped member 81 in the main scanning direction.

Next, mounting units 150 formed in the body of the inkjet printer 1 will be described with reference to FIG. 6. Four of the mounting units 150 juxtaposed in the sub scanning direction are provided in the printer body for receiving the respective ink cartridges 40 when the ink cartridges 40 are mounted in the printer body. Since the mounting units 150 have substantially the same structure, only one of the mounting units 150 will be described below.

Figure 6:
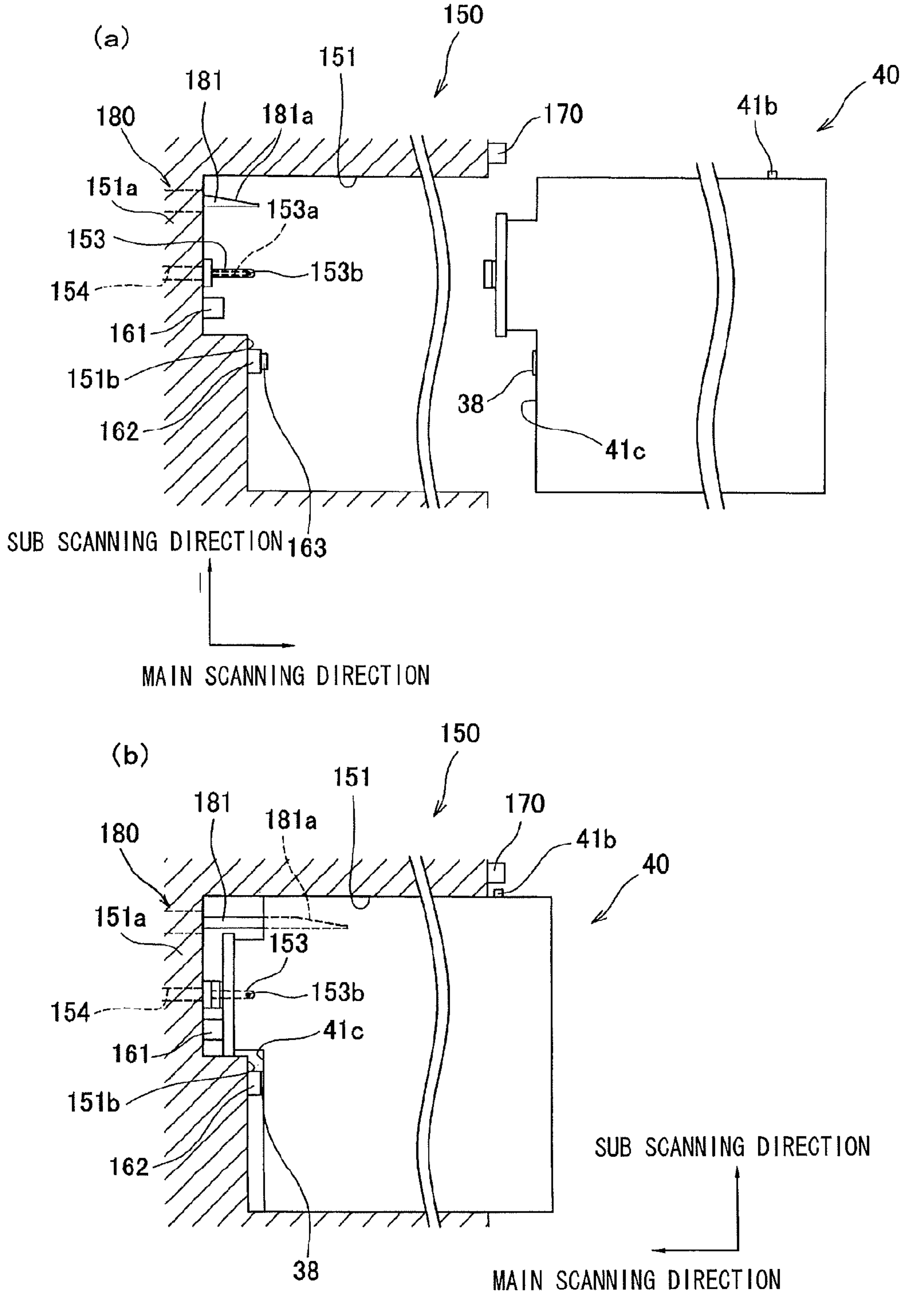
FIG. 6 is a partial cross-sectional view showing a state where the ink cartridge is about to be mounted to a mounting unit.

As shown in FIG. 6, the mounting unit 150 has a recessed part 151 that conforms to the outer shape of the ink cartridge 40. On an inner back part 151*a* of the recessed part 151 are provided the hollow needle 153, the ink supply channel 154, the contact 161 electrically connected to the controller 100, the power output unit 162 for outputting power produced by a power supply unit 110 (see FIG. 11) provided in the printer body, and an actuator 180.

The actuator 180 actuates the opening/closing mechanism 80 to switch the second valve 60 between open and closed states. The actuator 180 has a rod-shaped member 181 extending in the main scanning direction to a position confronting the opening 41*a* formed in the case 41 of the ink cartridge 40. Under control of the controller 100 in the printer body, the actuator 180 moves the rod-shaped member 181 in the main scanning direction. A tapered portion 181*a* is formed on the distal end of the rod-shaped member 181 so as to grow narrower toward the end.

The hollow needle 153 is longitudinally oriented in the main scanning direction and disposed at a position opposite the slit 51*a*. The hollow needle 153 has a hollow region 153*a* in fluid communication with the ink supply channel 154, and a hole 153*b* formed near the distal end thereof for providing external communication with the hollow region 153*a*. With this construction, the first valve 50 is in the open state described above and the hollow needle 153 is in communication with the ink channel 37*b* when the ink cartridge 40 is mounted in the printer body and the hole 153*b* in the hollow needle 153 has passed through the slit 51*a*. Conversely, when the hole 153*b* in the hollow needle 153 enters the slit 51*a* as the ink cartridge 40 is being removed from the printer body (when the spherical member 52 is in contact with the curved part 51*b*), the first valve 50 switches to the closed state described above and communication is interrupted between the hollow needle 153 and the ink channel 37*b*. Note that while communication between the hollow needle 153 and the ink channel 37*b* is established when the hole 153*b* passes through the slit 51*a*, ink does not flow from the ink bag 42 into the hollow region 153*a* until the second valve 60 has changed to the open state.

The contact 161 is juxtaposed with the hollow needle 153 in the sub scanning direction and positioned opposite the contact 36 of the mounted ink cartridge 40. The contact 161 is configured of a spring-like terminal that is displaceable in the main scanning direction. As the ink cartridge 40 is mounted in the printer body, the contact 161 establishes an electrical connection with the contact 36 prior to the spherical member 52 separating from the curved part 51*b* and the distal end of the detection rod 96 reaching a position in the translucent tube 98 confronting the photosensor 99. In other words, the contact 161 is electrically connected to the contact 36 when the first valve 50 changes to the open state. Conversely, when the ink cartridge 40 is being removed from the printer body, the contact 161 remains electrically connected to the contact 36 until the distal end of the detection rod 96 is extracted from a position within the translucent tube 98 confronting the photosensor 99.

The power output unit 162 is provided on a stepped surface 151*b* formed on the inner back part 151*a* of the recessed part 151. The power output unit 162 is disposed at a position confronting the power input unit 38 of the ink cartridge 40. The power output unit 162 also has the contact 163 that protrudes outward in the main scanning direction. As with the contact 161, the contact 163 becomes electrically connected with the contact 39 before the spherical member 52 separates from the curved part 51*b* and the distal end of the detection rod 96 reaches a position within the translucent tube 98 confronting the photosensor 99. Hence, the contact 163 is electrically connected to the contact 39 when the first valve 50 switches to the open state.

A sensor 170 is also provided near the opening of the recessed part 151 in each mounting unit 150. The sensor 170 is connected to the controller 100 and serves to detect when the ink cartridge 40 is mounted in the printer body. The sensor 170 is a reflective-type photosensor that includes a light-emitting unit and a light-receiving unit. The sensor 170 detects the presence of a protrusion 41*b* formed on the outer surface of the case 41. A mirror surface capable of reflecting light is formed on at least a portion of the protrusion 41*b*. When the ink cartridge 40 is completely mounted in the mounting unit 150 (when the locking body 95 has moved to the disengaged position), as shown in FIG. 6(*b*), light emitted from the light-emitting unit of the sensor 170 is reflected off the mirror surface of the protrusion 41*b* and received by the light-receiving unit. In response, the sensor 170 outputs a signal indicating that the light-receiving unit has received light (hereinafter referred to as a "signal C"). The sensor 170 transmits this signal C to the controller 100, as indicated by an arrow in FIG. 11. On the other hand, immediately after the ink cartridge 40 begins moving out of the printer body (when the protrusion 41*b* moves to a position not opposing the sensor 170 while the first valve 50 remains in the open state), light emitted from the light-emitting unit is not reflected off the mirror surface of the protrusion 41*b* and, hence, not received by the light-receiving unit. In response, the sensor 170 outputs a signal indicating that the light-receiving unit is not receiving light (hereinafter referred to as a "signal D"). The sensor 170 transmits the signal D to the controller 100. Upon receiving these signals, the controller 100 can determine whether the ink cartridge 40 is mounted in the printer body. In the preferred embodiment, the controller 100 determines that the ink cartridge 40 is mounted in the printer body upon receiving the signal C indicating that the light-receiving unit is receiving light, and determines that the ink cartridge 40 is not mounted in the printer body upon receiving the signal D indicating that the light-receiving unit is not receiving light. While the sensor 170 is a reflective-type photosensor in the preferred embodiment, a transmissive-type sensor or a sensor other than a photosensor may be used instead.

Next, operations performed when an ink cartridge 40 is mounted in the printer body will be described with reference to FIG. 7. To mount ink cartridges 40 in the printer body, the operator opens the door 1*c* on the printer body and mounts each of the four ink cartridges 40 into their corresponding mounting units 150. At this time, the hollow needle 153 corresponding to each ink cartridge 40 is inserted through the slit 51*a*, and the distal end of the hollow needle 153 contacts the spherical member 52, moving the spherical member 52 and pressing member 94 rightward in FIG. 7(*a*) so that the spherical member 52 separates from the sealing member 51, and shifting the first valve 50 from the open state to the closed state. At the same time, the contact 163 of the power output unit 162 comes into contact with the contact 39 of the power input unit 38, enabling power to be supplied to the photosensor 99. Since power can be supplied to the photosensor 99 when the first valve 50 changes to the open state, the photosensor 99 can detect displacement of the locking member 92 (detection rod 96). Also at this time, the contact 161 comes into electrical contact with the contact 36 and thereby establishes an electrical connection between the controller 100 and photosensor 99.

As the hollow needle 153 is further inserted, the distal end of the pressing member 94 contacts the locking body 95, moving the locking body 95 from the locking position shown in FIG. 7(*b*) to the disengaged position shown in FIG. 7(*c*), at which time the ink cartridge 40 is completely mounted in the printer body (hereinafter called the "fully mounted position"). When the ink cartridge 40 reaches the fully mounted position, the sensor 170 detects the protrusion 41*b* and outputs the signal C to the controller 100. Further, when the locking body 95 arrives in the disengaged position, the distal end of the detection rod 96 has arrived at a position within the translucent tube 98 confronting the photosensor 99. Accordingly, the photosensor 99 detects the detection rod 96 and outputs the signal A to the controller 100 via the contacts 36 and 161, indicating that the locking mechanism 90 has unlocked the valve member 61.

Upon receiving the signal A from the photosensor 99, the controller 100 controls the actuator 180 to move the rod-shaped member 181 so as to extend the rod-shaped member 181 farther in the main scanning direction, as illustrated in FIG. 7(*d*). Through this operation, the tip of the rod-shaped member 181 passes through the opening 41*a* formed in the case 41 and is inserted between the roller 83 and cover 49. As the tip of the rod-shaped member 181 is inserted, the roller 83 is forced upward in FIG. 7 along the tapered portion 181*a*. Consequently, the valve member 61 also moves upward in FIG. 7 along with the roller 83, shifting from the closed position to the open position. In this way, the second valve 60 is shifted from the closed state to the open state, allowing ink in the ink bag 42 to flow through the ink-delivery tube 43 into the hollow needle 153. Accordingly, ink can be supplied from the ink cartridge 40 to the inkjet head 2.

Next, the operations performed when an ink cartridge 40 is removed from the printer body will be described. When an ink cartridge 40 has run out of ink, for example, the operator opens the door 1*c* and removes the ink cartridge 40 from the printer body. As the ink cartridge 40 moves out of the printer body, the sensor 170 detects the protrusion 41*b* and outputs the signal D to the controller 100 indicating that removal of the ink cartridge 40 has been initiated. Upon receiving the signal D, the controller 100 controls the actuator 180 to retract the rod-shaped member 181 in the main scanning direction. As the rod-shaped member 181 is retracted from the opening 41*a* in this way, the rod-shaped member 181 disengages from the roller 83, moving the valve member 61 to the closed position. Consequently, the second valve 60 shifts from the open state to the closed state, interrupting communication between the ink channels 37*a* and 37*b*.

As the ink cartridge 40 continues to be removed from the mounting unit 150, the hollow needle 153 is retracted from the slit 51*a* of the sealing body 51, allowing the spherical member 52 and pressing member 94 to be moved leftward in FIG. 7 by the urging force of the coil spring 53. Further, when the second valve 60 switches to the closed state, the urging force of the coil spring 93 moves the locking member 92 from the disengaged position to the locking position (see FIG. 7(*b*)). Accordingly, the locking body 95 locks the valve member 61 to prevent the second valve 60 from switching back to the open state. At this time, the photosensor 99 no longer detects the detection rod 96 and outputs the signal B to the controller 100 via the contacts 36 and 161 indicating that the locking mechanism 90 has locked the valve member 61.

As the ink cartridge 40 continues to move out of the mounting unit 150, the distal end of the hollow needle 153 enters the slit 51*a*, at which time the spherical member 52 contacts the curved part 51*b*, switching the first valve 50 to the closed state. At this time, the contacts 163 and 39 are disconnected and the contacts 36 and 161 are disconnected. Thereafter, the operator replaces the ink cartridge 40 that was removed from the printer body with a new ink cartridge 40, mounting the new ink cartridge 40 in the printer body according to the procedure described above.

When the ink cartridge 40 according to the preferred embodiment described above is removed from the printer body (the casing 1*a*), the first valve 50 is in the closed state and the locking mechanism 90 locks the second valve 60 in the closed state. Hence, the ink cartridge 40 according to the preferred embodiment can prevent a large amount of ink leakage, even if the first valve 50 is broken. The inkjet printer 1 according to the preferred embodiment includes ink cartridges 40 having the effects described above. Further, the inkjet printer 1 moves the second valve 60 into the open state after the detection unit 97 detects that the second valve 60 has been unlocked, thereby avoiding damage to the second valve 60 and locking mechanism 90 that could occur if the second valve 60 were moved while still locked. Accordingly, the inkjet printer 1 according to the preferred embodiment also prevents ink leakage that might occur if the second valve 60 or locking mechanism 90 were damaged. Since the coil spring 93 can move the locking body 95 to the disengaged position and the coil spring 53 can move the spherical member 52 to the open position, the inkjet printer 1 having this construction can supply ink from the ink bang 42 of the liquid cartridge 40 to the inkjet head 2.

When the ink cartridge 40 is removed from the printer body, the locking mechanism 90 locks the second valve 60 in its closed state. Accordingly, the locking mechanism 90 can prevent the valve member 61 from moving and opening the second valve 60 when the user touches the opening/closing mechanism 80 or when the ink cartridge 40 incurs impacts during transport.

The locking mechanism 90 also has the locking member 92 capable of locking the valve member 61 when the locking mechanism 90 is moved to the locking position. Hence, the locking mechanism 90 for locking the second valve 60 can be implemented through a simple construction. By also providing the locking mechanism 90 with the pressing member 94, the operation for inserting the hollow needle 153 through the sealing body 51 and the operation for unlocking the second valve 60 can be associated through a simple construction. Further, the detection unit 97 provided in the ink cartridge 40 can detect when the second valve 60 is unlocked.

Figure 8:
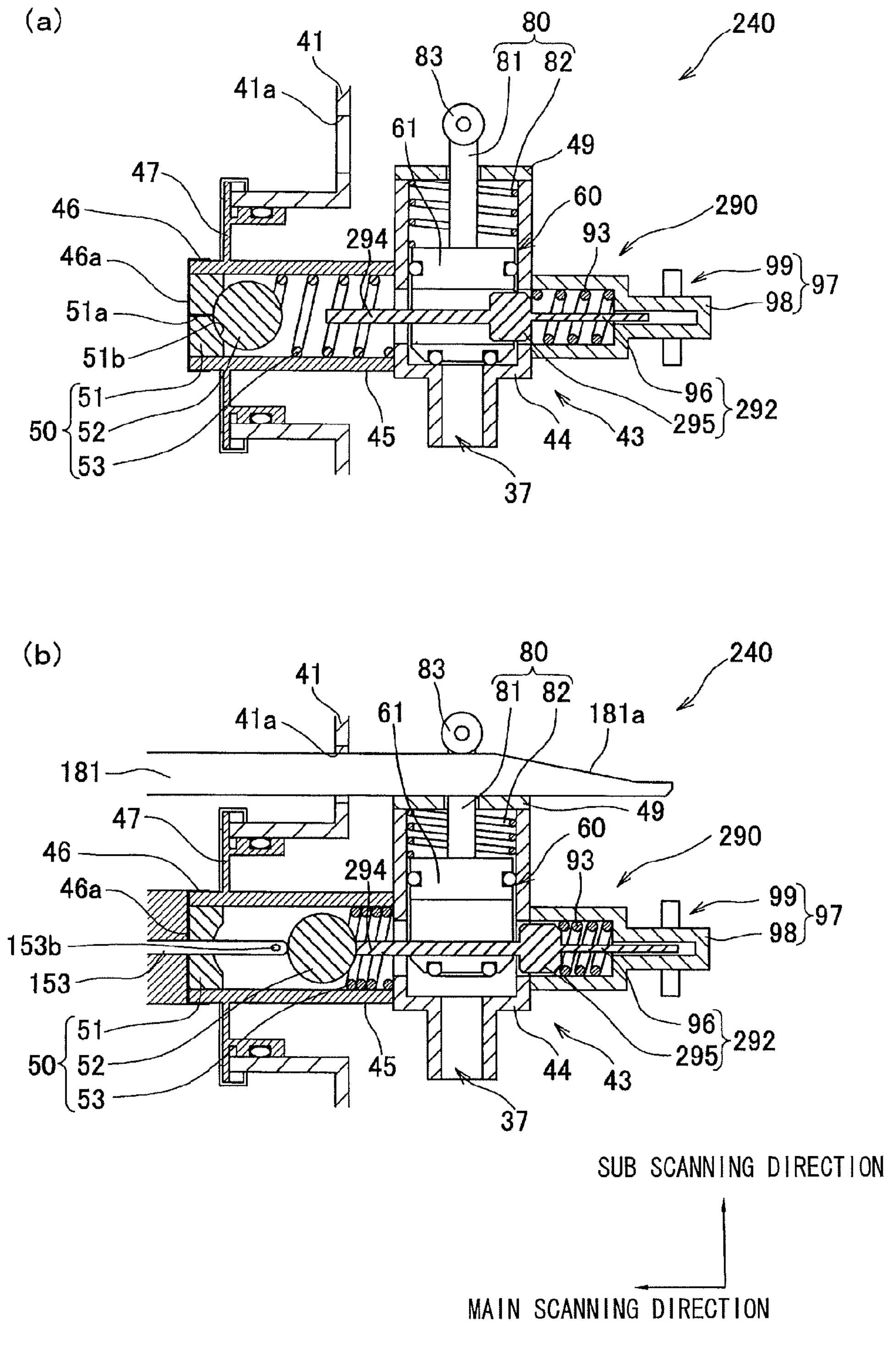
FIG. 8 is a diagram of an ink cartridge according to a first modification, wherein FIG. 8(*a*) shows a state where first and second values are in the closed state, and FIG. 8(*b*) shows a state where the first and second valves are in the open state.

Next, an ink cartridge 240 according to a first variation of the preferred embodiment will be described with reference to FIG. 8. As shown in FIG. 8, the ink cartridge 240 has a locking mechanism 290. The locking mechanism 290 is integrally formed of a pressing member 294 and a locking member 292. In this variation, a recessed part is not formed in a locking body 295 of the locking member 292. Accordingly, the length of the pressing member 294 in the main scanning direction may be shorter than the pressing member 94 of the preferred embodiment by the depth of the recessed part 95*a*. Hence, when the first valve 50 is in the closed state, the gap formed between the pressing member 294 and the spherical member 52 in the first variation is equivalent to the gap between the pressing member 94 and the back inner surface of the recessed part 95*a* formed in the locking member 92 of the preferred embodiment.

With this construction, when the hollow needle 153 is inserted through the slit 51*a* as the ink cartridge 240 is mounted in the printer body, as shown in FIG. 8(*b*), the hollow needle 153 contacts the spherical member 52, and the spherical member 52 moves along with the insertion of the hollow needle 153, switching the first valve 50 to the open state. Subsequently, the spherical member 52 contacts the pressing member 294, moving the locking body 295 from the locking position to the disengaged position. All subsequent operations are equivalent to those described in the preferred embodiment.

Conversely, when the ink cartridge 240 is removed from the printer body, the rod-shaped member 181 is first extracted through the opening 41*a* as the ink cartridge 240 is being removed, allowing the valve member 61 to move into its closed position, as described in the preferred embodiment. Hence, the second valve 60 is now in the closed state. Since the hollow needle 153 is being extracted through the slit 51*a* at this time, the spherical member 52 moves leftward in FIG. 8. After the second valve 60 shifts to the closed state, the urging force of the coil spring 93 moves the pressing member 294 and the locking member 292 from the disengaged position to the locking position (see FIG. 8(*a*)). Therefore, the second valve 60 is locked in the closed state.

Figure 9:
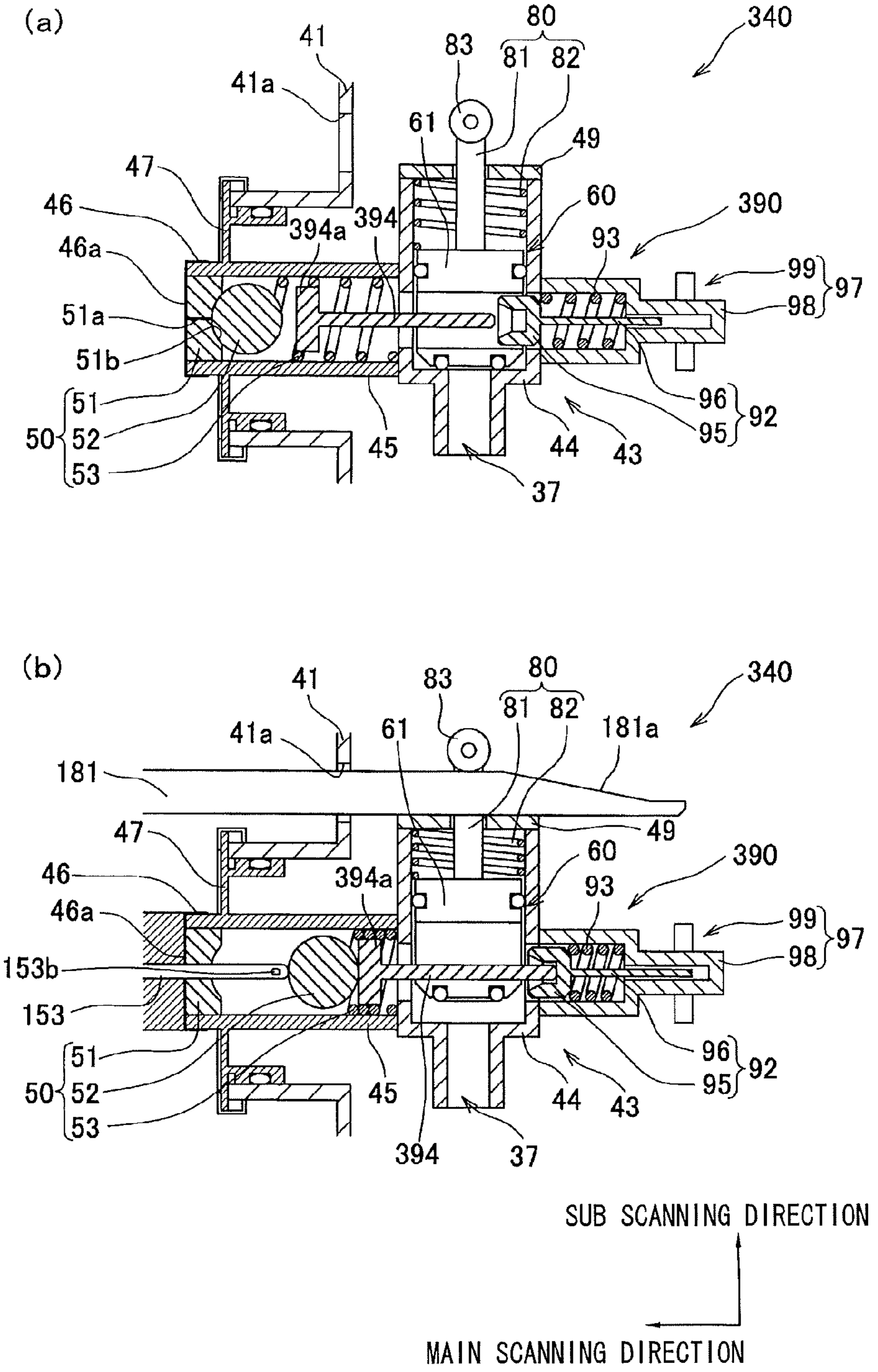
FIG. 9 is a diagram of an ink cartridge according to a second modification, wherein FIG. 9(*a*) shows a state where a first and second values are in the closed state, and FIG. 9(*b*) shows a state where the first and second valves are in the open state.

FIG. 9 shows an ink cartridge 340 according to a second variation of the preferred embodiment. As shown in FIG. 9, the ink cartridge 340 includes a locking mechanism 390 having a pressing member 394. The pressing member 394 of the locking mechanism 390 is not integrally formed with either the spherical member 52 or the locking member 92, but is disposed between these two members. In the second variation, the length of the pressing member 394 in the main scanning direction is equivalent to the pressing member 94 of the preferred embodiment. Hence, when the first valve 50 is in the closed state, the sum of the distance between the pressing member 394 and the spherical member 52 and the distance between the pressing member 394 and the inner back surface of the recessed part 95*a* formed in the locking member 92 of the second variation is equivalent to the distance between the pressing member 94 and the inner back surface of the recessed part 95*a* according to the preferred embodiment. It is also preferable to form a protuberance 394*a* on the end of the pressing member 394 confronting the spherical member 52 for guiding movement of the pressing member 394 along the inner peripheral surface of the coil spring 53. With this construction, the pressing member 394 can move along the inner peripheral surface of the coil spring 53 as the spherical member 52 and locking member 92 move, as shown in FIG. 9(*b*).

When mounting the ink cartridge 340 of this second variation in the printer body, the hollow needle 153 is inserted through the slit 51*a*, as shown in FIG. 9(*b*), and contacts the spherical member 52. The spherical member 52 is forced to move rightward in FIG. 9(*b*) along with the insertion of the hollow needle 153, shifting the first valve 50 into its open state. Subsequently, the spherical member 52 contacts the pressing member 394, which in turn contacts the locking member 92, and the locking body 95 moves from the locking position to the disengaged position along with the movement of the spherical member 52. All subsequent operations are identical to those described in the preferred embodiment.

Conversely, when the ink cartridge 340 is removed from the printer body, the rod-shaped member 181 is first extracted through the opening 41*a* as the ink cartridge 340 is being removed, allowing the valve member 61 to move into its closed position, as described in the preferred embodiment. Hence, the second valve 60 is now in the closed state. Since the hollow needle 153 is being extracted through the slit 51*a* at this time, the spherical member 52 moves leftward in FIG. 9. After the second valve 60 shifts to the closed state, the urging force of the coil spring 93 moves the pressing member 394 and the locking member 92 from the disengaged position to the locking position (see FIG. 9(*a*)). Therefore, the second valve 60 is locked in the closed state.

Figure 10:
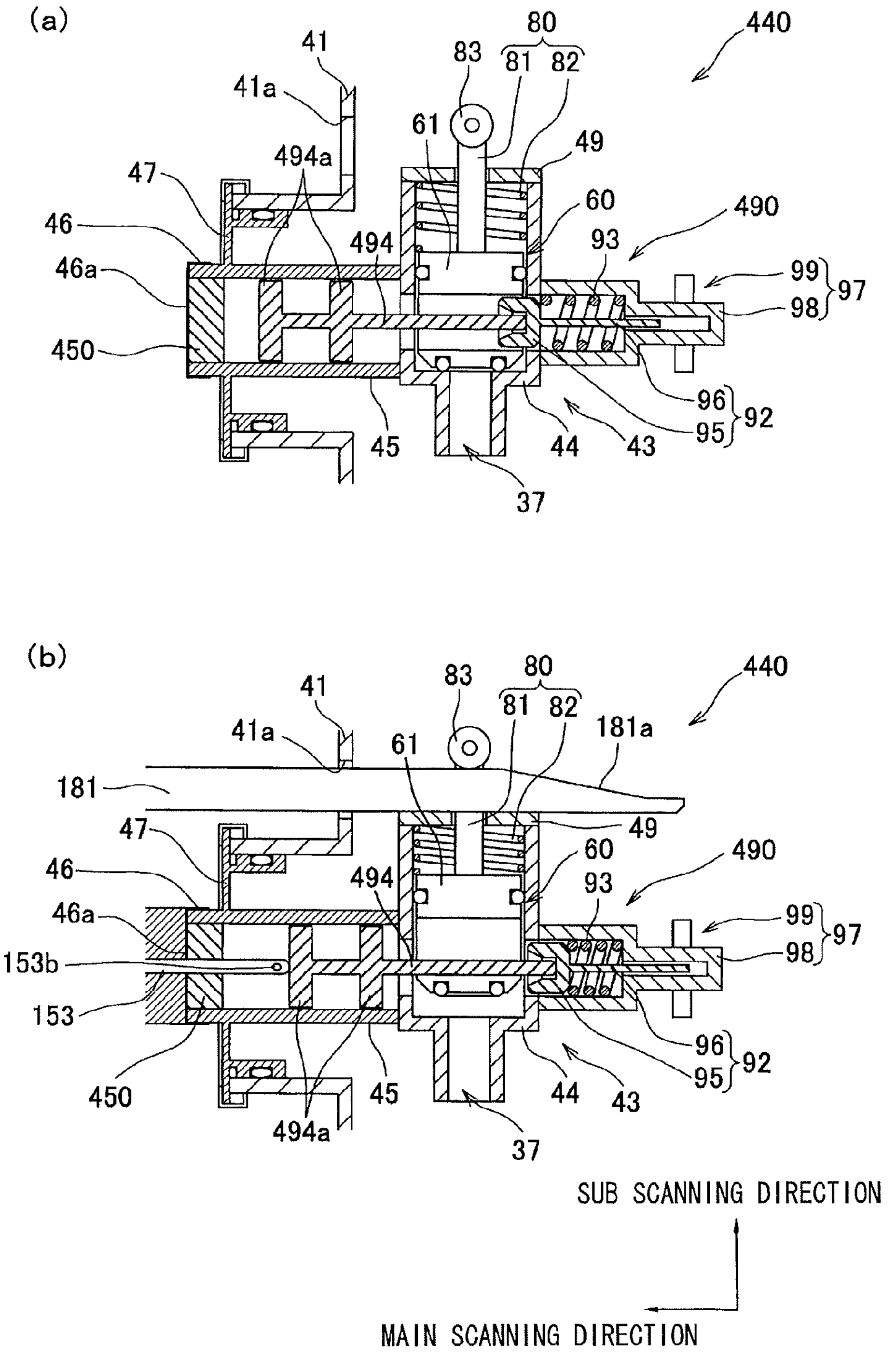
FIG. 10 is a diagram of an ink cartridge according to a third modification, wherein FIG. 10(*a*) shows a state where a first and second values are in the closed state, and FIG. 10(*b*) shows a state where the first and second valves are in the open state.

FIG. 10 shows an ink cartridge 440 according to a third variation of the preferred embodiment. As shown in FIG. 10, the first valve of the ink cartridge 440 is configured of a sealing body 450 for sealing the opening (ink outlet) in one end (the left end in FIG. 10) of the tube 45. The ink cartridge 440 also includes a locking mechanism 490 having a pressing member 494. In the third variation, the length of the pressing member 494 in the main scanning direction is equivalent to the length obtained by adding the diameter of the spherical member 52 to the length of the pressing member 394 in the second variation described above. Hence, the sum of the distance between the sealing body 450 and the pressing member 494 and the distance between the pressing member 494 and the inner back surface of the recessed part 95*a* formed in the locking member 92 of the third variation is equivalent to the distance between the pressing member 94 and the inner back surface of the recessed part 95*a* according to the preferred embodiment when the first valve 50 is in the closed state. Since the pressing member 494 is in contact with the inner back surface of the recessed part 95*a* in FIG. 10(*a*), the distance between the sealing body 450 and pressing member 494 is equivalent to the distance between the pressing member 94 and inner back surface of the recessed part 95*a* according to the preferred embodiment when the first valve 50 is in the closed state. Two large-diameter parts 494*a* are preferably formed on the pressing member 494, with one on the distal end of the pressing member 494 (the end nearest the sealing body 450) and one on a midway portion of the pressing member 494. The large-diameter parts 494*a* have a slightly smaller diameter than the inner diameter of the tube 45. With this construction, the tip of the hollow needle 153 can reliably contact the pressing member 494, as shown in FIG. 10(*b*). The pressing member 494 can also move along the main scanning direction without slanting relative to the main scanning direction. The sealing body 450 is formed of the same material as the sealing body 51 described in the preferred embodiment. Further, the inner dimension of the tube 45 according to the third variation in the direction orthogonal to the main scanning direction and sub scanning direction is larger than that of the large-diameter parts 494*a*, allowing ink flow between the large-diameter parts 494*a* and the walls of the tube 45.

In the third variation of the preferred embodiment, when the hollow needle 153 is first inserted through the sealing body 450 serving as the first valve, the sealing body 450 is switched to an open state when the hollow needle 153 penetrates the sealing body 450 (i.e., when the distal end of the hollow needle 153 passes through the right edge of the sealing body 450). However, if the hollow needle 153 is subsequently retracted and then reinserted into the sealing body 450, the sealing body 450 is switched to the open state as soon as the distal end of the hollow needle 153 is inserted into the sealing body 450 (i.e., when the distal end of the hollow needle 153 passes through the left edge of the sealing body 450). The sealing body 450 enters the open state at this time because a through-hole was formed in the sealing body 450 when the hollow needle 153 was first inserted. When the hollow needle 153 is pulled out of the sealing body 450, the elastic restoring force of the sealing body 450 closes the through-hole formed therein, shifting the sealing body 450 into the closed state. When the hollow needle 153 is once again inserted into the sealing body 450, the closed through-hole is opened when the tip of the hollow needle 153 is inserted therein, shifting the sealing body 450 into the open state.

When the ink cartridge 440 having this construction is mounted in the printer body, the sealing body 450 is shifted to the open state as the hollow needle 153 penetrates the sealing body 450, as shown in FIG. 10(*b*). Subsequently, the tip of the hollow needle 153 contacts the pressing member 494, which in turn contacts the locking member 92. As the hollow needle 153 is inserted farther, the locking body 95 moves from the locking position to the disengaged position. The remaining operations are identical to those described in the preferred embodiment.

On the other hand, when the ink cartridge 440 is removed from the printer body, first the rod-shaped member 181 is extracted through the opening 41*a* as the ink cartridge 440 moves out of the mounting unit 150, and the valve member 61 shifts to the closed position, as described in the preferred embodiment. In other words, the second valve 60 shifts to the closed state. At this time, the hollow needle 153 is extracted from the sealing body 450. When the second valve 60 enters the closed state, the urging force of the coil spring 93 moves the pressing member 494 and locking member 92 from the disengaged position to the locking position (see FIG. 10(*a*)). Through this operation, the second valve 60 is locked in the closed state.

In the first through third variations described above, the second valve 60 is locked by the locking mechanism when in its closed state, thereby obtaining the same effects described in the preferred embodiment. Further, the first valve in the third variation is configured only of the sealing body 450, thereby simplifying the structure of the first valve.

In the preferred embodiment and the first and second variations thereof, the pressing members 94, 294 and 394 may be formed slightly longer in the main scanning direction and formed integrally with the spherical member 52 and the locking member 92 or 292. With these structures, the locking member 92 or 292 move from the locking position to the disengaged position at the same time the spherical member 52 moves from the closed state to the open state. Also, it is only necessary to provide one of the coil springs for urging the spherical member 52 and for urging the locking member 92 or 292 (i.e., one of the coil springs 53 and 93, respectively). In the third variation of the preferred embodiment, the pressing member 494 and the locking member 92 may be formed integrally.

In the preferred embodiment and the first through third variations thereof, when the first valve is in the closed state, a gap is formed either between the spherical member 52 or sealing body 450 and the pressing member 94, 294, 394, or 494, or between the pressing member and the locking member 92 or 292, or between both. However, it is not necessary to form a gap in either location.

In the preferred embodiment and the first through third variations thereof, the protrusion 41*b* is provided on the ink cartridge and the sensor 170 is provided on the mounting unit 150. However, in place of these components, a sensor may be provided for detecting whether the door 1*c* is in an open or closed state. In this case, when the controller 100 receives a signal from the sensor indicating that the door 1*c* has moved from the closed state to the open state in order to remove an ink cartridge from the printer body (while the rod-shaped member 181 is extended), the controller 100 controls the actuator 180 to retract the rod-shaped member 181. On the other hand, when the controller 100 receives a signal from the sensor indicating that the door 1*c* was moved from the open state to the closed state to mount the ink cartridge in the printer body (while the rod-shaped member 181 is in a retracted state), the controller 100 controls the actuator 180 to extend the rod-shaped member 181.

In the preferred embodiment and the first through third variations thereof, the controller 100 controls the actuator 180 to retract the rod-shaped member 181 upon receiving a signal from the sensor 170 when the operator begins removing an ink cartridge from the printer body. However, the controller 100 may retract the rod-shaped member 181 after the hollow needle 153 is completely withdrawn from the sealing body 51 or 450 (or after the ink cartridge is completely removed from the mounting unit 150). In this case, the second valve 60 is closed after closing the first valve 50 or sealing body 450, but the second valve 60 is automatically locked by the locking mechanism 90, 290, 390, or 490 when the second valve 60 is closed. Therefore, the second valve 60 is locked in the closed state by the locking mechanism 90, 290, 390, or 490, suppressing ink leakage, even if the first valve 50 or sealing body 450 is broken.

Figure 12:
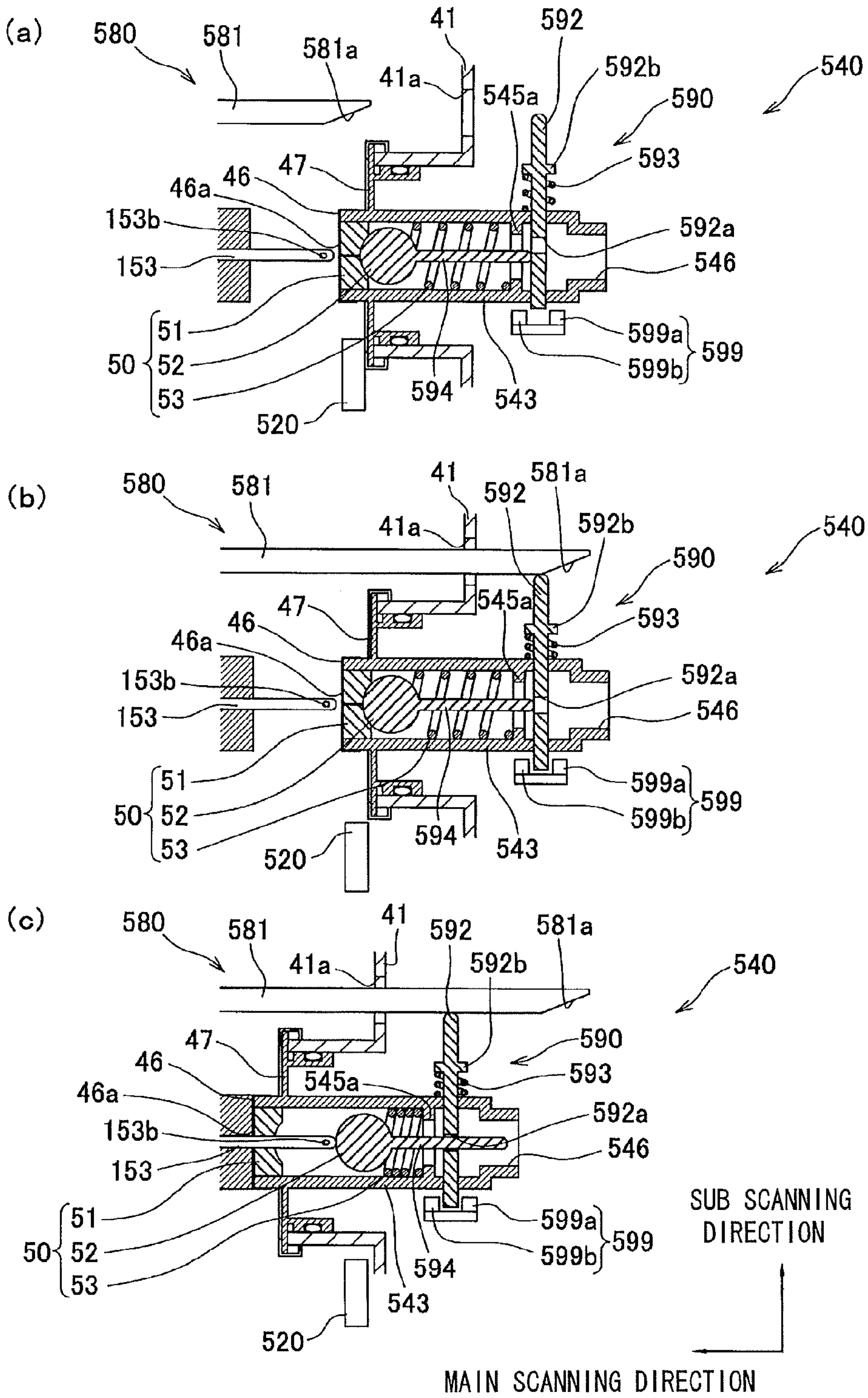

FIG. 12 shows an ink cartridge 540 according to a fourth variation of the preferred embodiment. As shown in FIG. 12, the ink cartridge 540 does not include the second valve 60 described in the preferred embodiment, but has a locking mechanism 590 capable of preventing the first valve 50 from switching from the closed state to the open state.

The ink cartridge 540 of the fourth variation includes an ink-delivery tube 543 that extends in the main scanning direction. The ink-delivery tube 543 has an ink channel 546 formed therein. The first valve 50 is disposed inside the ink-delivery tube 543. The sealing body 51 is provided in one end of the ink-delivery tube 543, while the other end of the ink-delivery tube 543 is connected to the ink bag 42. In other words, the ink channel 546 and the ink bag 42 are in fluid communication. An annular protrusion 545*a* is formed on the inner surface of the ink-delivery tube 543, protruding inward. The end of the coil spring 53 opposite the spherical member 52 contacts the annular protrusion 545*a*. The coil spring 53 constantly urges the spherical member 52 toward the sealing body 51.

The locking mechanism 590 is provided in the ink-delivery tube 543. The locking mechanism 590 includes a locking member 592, a coil spring 593, and a restricting member 594. The locking member 592 is a rod-shaped member that penetrates the ink-delivery tube 543 in the sub scanning direction. More specifically, two through-holes are formed in opposing sides of the ink-delivery tube 543 at positions between the annular protrusion 545*a* and the end connected to the ink bag 42. The locking member 592 is inserted through both through-holes. Relatively large gaps are formed between the locking member 592 and the inner surface of the ink-delivery tube 543 so as not to hinder the flow of ink through the ink channel 546. Sealing members such as O-rings (not shown) are provided around the locking member 592 in the gaps formed in the through-holes in order to prevent ink in the ink channel 546 from leaking out through the gaps in the through-holes.

A hole 592*a* is formed in the locking member 592 in a portion positioned within the ink-delivery tube 543. The hole 592*a* penetrates the locking member 592 in the main scanning direction. The locking member 592 is disposed so as to be movable in the sub scanning direction between a disengaged position in which the hole 592*a* opposes the distal end of the restricting member 594 in the main scanning direction (the position shown in FIG. 12(*b*)) and a locking position in which the hole 592*a* does not oppose the distal end of the restricting member 594 in the main scanning direction (the position shown in FIG. 12(*a*)). The hole 592*a* has a slightly larger opening than the cross-sectional shape of the restricting member 594 so that the restricting member 594 can be inserted through the hole 592*a* when the locking member 592 is in the disengaged position. An annular protrusion 592*b* is also formed around a portion of the locking member 592 positioned outside the ink-delivery tube 543. The coil spring 593 is disposed between the annular protrusion 592*b* and the ink-delivery tube 543, with one end of the coil spring 593 contacting the annular protrusion 592*b* and the other end contacting the ink-delivery tube 543. The coil spring 593 constantly urges the locking member 592 upward in FIG. 12.

The restricting member 594 has substantially the same structure as the pressing member 94 described in the preferred embodiment. As shown in FIG. 12(*a*), the length of the restricting member 594 in the main scanning direction is set such that the distal end of the restricting member 594 can contact the surface of the locking member 592 on the sealing body 51 side when the locking member 592 is in the locking position. At this time, the pressure with which the restricting member 594 contacts the locking member 592 is negligible and does not hinder movement of the locking member 592 in the sub scanning direction.

The ink cartridge 540 also has a photosensor 599. The photosensor 599 includes a light-emitting unit 599*a*, and a light-receiving unit 599*b* for receiving light emitted from the light-emitting unit 599*a*. When the locking member 592 is in the disengaged position, an end of the locking member 592 (the lower end in FIG. 12) is positioned just between the light-emitting unit 599*a* and light-receiving unit 599*b*. Since the end of the locking member 592 in the disengaged position blocks light emitted from the light-emitting unit 599*a*, the photosensor 599 can detect the locking member 592 and transmits a detection signal to the controller 100 via the contact 36.

Figure 13:
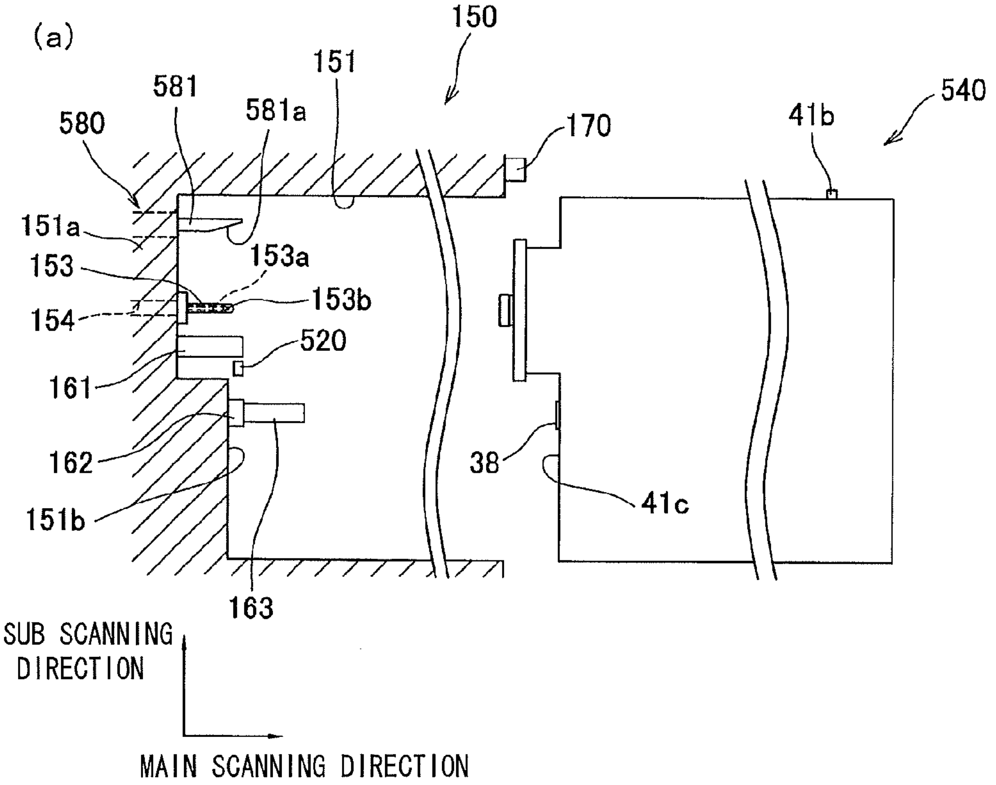
Figure 13:
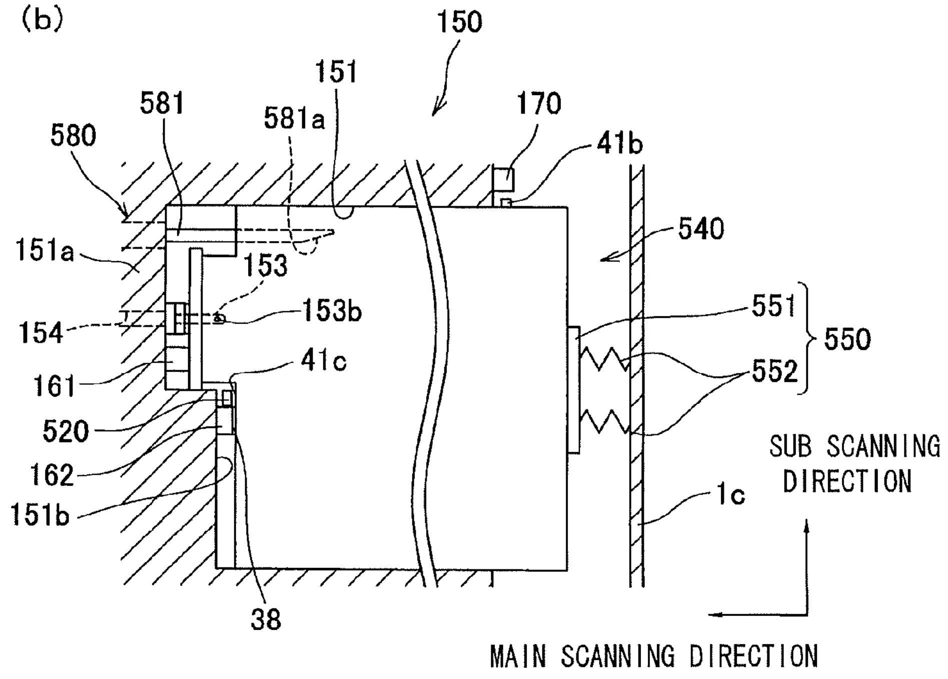

In the fourth variation, the mounting unit 150 is provided with an actuator 580 in place of the actuator 180, as shown in FIG. 13. The actuator 580 has a rod-shaped member 581 that actuates the locking member 592 by moving the locking member 592 from the locking position to the disengaged position. Under control of the controller 100 provided in the printer body, the actuator 580 moves the rod-shaped member 581 in the main scanning direction. The distal end of the rod-shaped member 581 is formed as a tapered part 581*a* that grows narrower toward the end. While the actuator 580 is employed in the fourth variation of the preferred embodiment for moving the rod-shaped member 581 in the main scanning direction, the rod-shaped member 581 may instead be provided with a rack and may be moved in the main scanning direction by a pinion engaged with the rack, for example.

The mounting unit 150 is also provided with a stopper 520 for restricting mounting of the ink cartridge 540. The stopper 520 is supported by a moving mechanism (not shown). The moving mechanism can slidably move the stopper 520 in the sub scanning direction between a restricting position (position shown in FIG. 12(*a*)) for restricting mounting of the ink cartridge 540, and a non-restricting position (allowing position shown in FIG. 12(*b*)) in which the mounting restriction is removed. The moving mechanism moves the stopper 520 in the sub scanning direction under control of the controller 100.

As shown in FIG. 13(*a*), the contact 161 of the mounting unit 150 in the fourth variation has a similar structure to that described in the preferred embodiment, but protrudes farther in the main scanning direction than the contact 161 in the preferred embodiment. The contact 161 is configured to electrically connect to the contact 36 when the ink cartridge 540 is disposed in an abutting position abutting the stopper 520. When the contacts 36 and 161 are electrically connected with each other, the controller 100 recognizes that the ink cartridge 540 is in the abutting position and controls the actuator 580 as described below. Conversely, when the electrically connected contacts 36 and 161 are separated from each other, the controller 100 controls the actuator 580 and the moving mechanism as described below.

As shown in FIG. 13(*a*), the contact 163 of the power output unit 162 in the fourth variation also protrudes farther in the main scanning direction than in the preferred embodiment described above. The contact 163 is configured to electrically connect to the contact 39 when the ink cartridge 540 is in the abutting position. Through this electrical connection, power is supplied to the photosensor 599 when the ink cartridge 540 is disposed in the abutting position, enabling the photosensor 599 to output a detection signal to the controller 100.

As shown in FIG. 13(*b*), urging mechanisms 550 are provided on the inner surface of the door 1*c* at positions corresponding to each of the ink cartridges 540. Each urging mechanism 550 has a plate-shaped member 551, and two coil springs 552. When the operator closes the door 1*c*, the urging mechanisms 550 urge the ink cartridges 540 toward the corresponding mounting units 150.

Next, operations performed when the ink cartridge 540 is mounted in the printer body will be described with reference to FIG. 12. When mounting an ink cartridge 540 in the printer body, the operator opens the door 1*c* on the printer body, inserts the ink cartridge 540 in the corresponding mounting unit 150, and closes the door 1*c*. At this moment, the urging mechanism 550 is urging the ink cartridge 540 toward the mounting unit 150, while the flange 47 of the ink cartridge 540 is abutting the stopper 520 disposed in the restricting position. When the ink cartridge 540 is disposed in the abutting position, the contact 163 of the power output unit 162 is electrically connected to the contact 39 of the power input unit 38, whereby power is supplied to the photosensor 599. In addition, the contacts 36 and 161 are electrically connected, forming an electrically connected between the controller 100 and the photosensor 599.

When the contacts 36 and 161 become electrically connected, the controller 100 recognizes that the ink cartridge 540 is disposed in the abutting position and controls the actuator 580 to extend the rod-shaped member 581 in the main scanning direction, as illustrated in FIG. 12(*b*). When the rod-shaped member 581 is extended, the distal end of the rod-shaped member 581 passes through the opening 41*a* and sequentially contacts an end of the locking member 592 (the upper end in FIG. 12) with the tapered part 581*a* and the bottom surface of the rod-shaped member 581, moving the locking member 592 from the locking position to the disengaged position. When the locking member 592 is moved to the disengaged position, an end of the locking member 592 is positioned between the light-emitting unit 599*a* and the light-receiving unit 599*b*. Accordingly, the photosensor 599 detects the locking member 592 and outputs a detection signal to the controller 100 indicating that the locking member 592 is disengaged.

Upon receiving the detection signal from the photosensor 599, the controller 100 controls the moving mechanism to move the stopper 520 from its restricting position shown in FIG. 12(*a*) to the non-restricting position shown in FIG. 12(*b*). Consequently, the ink cartridge 540 being urged by the urging mechanism 550 is automatically inserted into the mounting unit 150, and the distal end of the hollow needle 153 contacts the spherical member 52 and moves the spherical member 52 and restricting member 594 rightward in FIG. 12. Since the locking member 592 is in the disengaged position at this time, the restricting member 594 is inserted through the hole 592*a*, as shown in FIG. 12(*c*). Hence, the spherical member 52 separates from the sealing body 51, shifting the first valve 50 from the closed state to the open state. In this state, ink accommodated in the ink bag 42 flows into the hollow needle 153 via the ink channel 546 in the ink-delivery tube 543, enabling ink to be supplied from the ink cartridge 540 to the inkjet head 2. When the ink cartridge 540 is in the fully mounted position, the sensor 170 detects the protrusion 41*b* and outputs a detection signal to the controller 100 indicating that the ink cartridge 540 is fully mounted in the mounting unit 150.

Next, the operations performed when the ink cartridge 540 is removed from the printer body will be described. To remove the ink cartridge 540 from the printer body, the operator opens the door 1*c* on the printer body and pulls the ink cartridge 540 out of the mounting unit 150. As the ink cartridge 540 begins moving out of the mounting unit 150, the hollow needle 153 is extracted from the slit 51*a*, allowing the spherical member 52 and restricting member 594 to move leftward in FIG. 12 by the urging force of the coil spring 53. Subsequently, the spherical member 52 contacts the curved part 51*b*, shifting the first valve 50 to the closed state and extracting the restricting member 594 from the hole 592*a*.

As the ink cartridge 540 is further removed from the mounting unit 150, the contacts 163 and 39 are disconnected and the contacts 36 and 161 are disconnected. A prescribed time after the contacts 36 and 161 are separated (10 seconds, for example), the controller 100 controls the actuator 580 to retract the rod-shaped member 581 in the main scanning direction. Consequently, the rod-shaped member 581 is extracted through the opening 41*a* and disengages from the locking member 592. Note that when the user is removing the ink cartridge 540 from the mounting unit 150, this movement also causes the rod-shaped member 581 to be extracted through the opening 41*a* and to disengage from the locking member 592. When the rod-shaped member 581 is disengaged from the locking member 592, the urging force of the coil spring 593 moves the locking member 592 into the locking position (the state shown in FIG. 12(*a*)).

At the same time the controller 100 controls the actuator 580, the controller 100 also controls the moving mechanism to move the stopper 520 from the non-restricting position to the restricting position. Since the ink cartridge 540 has been pulled out past the abutting position when the stopper 520 is moved to the restricting position, the stopper 520 does not contact the ink cartridge 540. Subsequently, the operator replaces the ink cartridge 540 that was removed from the printer body with a new ink cartridge 540, mounting the new ink cartridge 540 in the printer body according to the procedure described above.

With the ink cartridge 540 according to the fourth variation described above, the locking mechanism 590 locks the first valve 50 in the closed state when the ink cartridge 540 is removed from the printer body. This operation of the locking mechanism 590 prevents the spherical member 52 from moving and opening the first valve 50, even when the ink cartridge 540 is impacted during transport. The ink cartridge 540 according to the fourth variation of the embodiment obtains the same effects described in the preferred embodiment and the first through third variations thereof that are attributed to similar structures.

Figure 14:
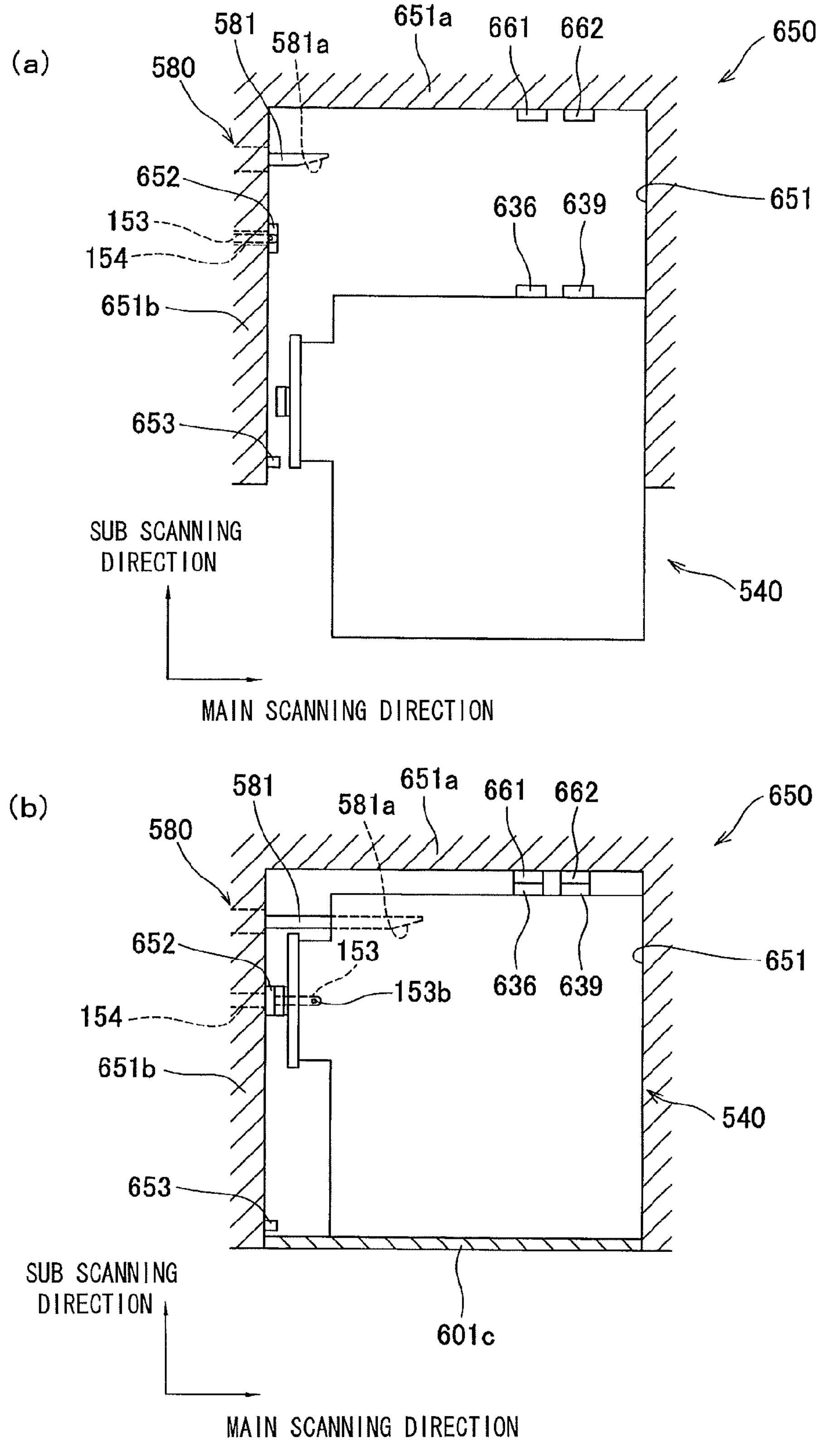

FIG. 14 shows a mounting unit 650 according to a fifth variation of the preferred embodiment. The mounting unit 650 is provided in the printer body. When the ink cartridge 540 is mounted in the printer body, the ink cartridge 540 is inserted into the mounting unit 650 in the sub scanning direction.

As shown in FIG. 14, the mounting unit 650 has a recessed part 651 that conforms to the outer shape of the ink cartridge 540. The recessed part 651 has a bottom part 651*a* provided with a contact 661 electrically connected to the controller 100, and a contact 662 of a power output unit for supplying electricity produced by the power supply unit 110 provided in the printer body. The recessed part 651 shown on the left side in FIG. 14 has a wall part 651*b* provided with the hollow needle 153, the ink supply channel 154, and the actuator 580, as well as a sliding mechanism 652 and a door sensor 653.

The sliding mechanism 652 functions to slide the hollow needle 153 in the main scanning direction. Under control of the controller 100, the sliding mechanism 652 slidably moves the hollow needle 153 in the main scanning direction between a retracted position in which the hollow needle 153 does not protrude out of the sliding mechanism 652 into the recessed part 651 (the position shown in FIG. 14(*a*)) and an ink delivery position in which the hollow needle 153 protrudes into the recessed part 651 from the sliding mechanism 652 (the position shown in FIG. 14(*b*)). One end of the hollow needle 153 is in communication with the ink supply channel 154 at all times. The positional relationship of the hollow needle 153 in the ink delivery position and the ink cartridge 540 mounted in the mounting unit 650 is identical to the positional relationship of the hollow needle 153 and the ink cartridge 540 mounted in the mounting unit 150 according to the fourth variation described above.

The door sensor 653 is provided near the opening of the recessed part 651 and is connected to the controller 100. The door sensor 653 serves to detect whether a door 601*c* on the mounting unit 650 is in an open or closed state and to output a detection signal to the controller 100.

In the ink cartridge 540 according to the fifth variation of the embodiment, a contact 636 is provided in place of the contact 36 on the surface of the case 41 opposing the bottom part 651*a* (top surface in FIG. 14). The contact 636 is disposed at a position for electrically connecting with the contact 661 when the ink cartridge 540 is mounted in the mounting unit 650. As with the contact 36 in the preferred embodiment, the contact 636 is connected to the photosensor 599 and relays detection signals from the photosensor 599 to the controller 100 via the contact 661.

Another contact 639 is provided on the ink cartridge 540 next to the contact 636 in place of the contact 39 of the power input unit 38. The contact 639 is disposed at a position for electrically connecting with the contact 662 when the ink cartridge 540 is mounted in the mounting unit 650. The contact 639 is also electrically connected to the photosensor 599 and serves to supply power to the photosensor 599 when electrically connected to the contact 662.

Figure 15:
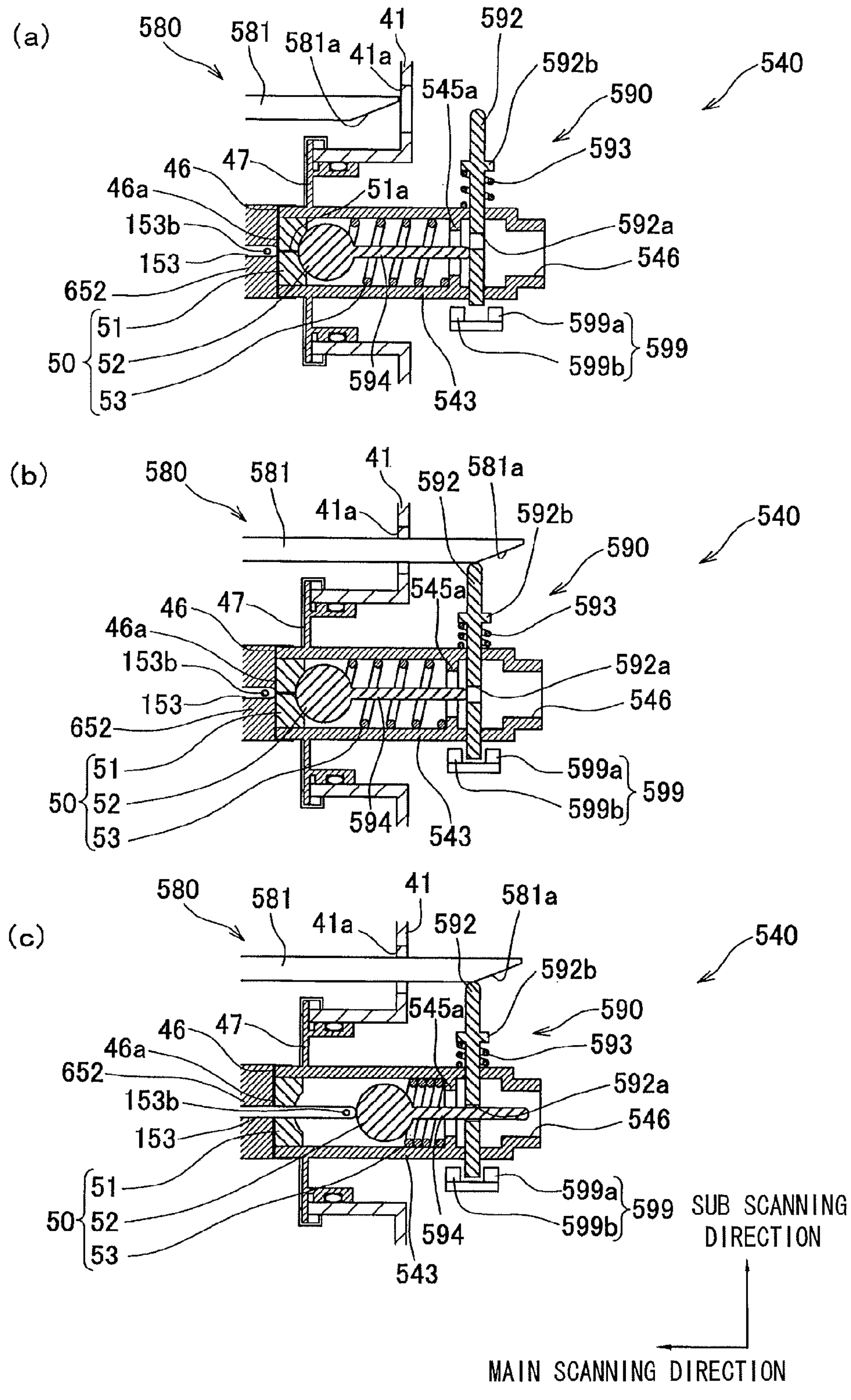
FIG. 15 is a partial cross-sectional view showing an operation state of a first valve where the ink cartridge shown in FIG. 14 is about to be mounted to the mounting unit.

Next, operations performed when mounting the ink cartridge 540 in the printer body will be described with reference to FIGS. 14 and 15. To mount the ink cartridge 540 in the printer body, the operator opens the door 601*c* on the printer body, inserts the ink cartridge 540 into the corresponding mounting unit 650, electrically connecting the contacts 636 and 661 and electrically connecting the contacts 639 and 662, and subsequently closes the door 601*c* (see FIG. 14(*b*)). When the contacts 636 and 661 are electrically connected, the controller 100 recognizes that the ink cartridge 540 is in a prescribed position (fully mounted position). When the ink cartridge 540 is disposed in the prescribed position, the rod-shaped member 581 of the actuator 580 opposes the opening 41*a* in the main scanning direction and the hollow needle 153 opposes the slit 51*a* in the main scanning direction, as shown in FIG. 15(*a*). Also at this time, the door sensor 653 outputs a detection signal to the controller 100 indicating that the door 601*c* was closed.

Upon receiving a detection signal from the door sensor 653, the controller 100 controls the actuator 580 to extend the rod-shaped member 581 in the main scanning direction, as shown in FIG. 15(*b*). Through this operation, the distal end of the rod-shaped member 581 passes through the opening 41*a* and sequentially contacts the end of the locking member 592 (the upper end in FIG. 15) by its tapered part 581*a* and the bottom surface of the rod-shaped member 581. This contact moves the locking member 592 from the locking position to the disengaged position. When the locking member 592 is moved to the disengaged position, the end of the locking member 592 (bottom end in FIG. 15) is positioned between the light-emitting unit 599*a* and light-receiving unit 599*b*. At this time, the photosensor 599 detects the locking member 592 and outputs a detection signal to the controller 100 indicating that the locking member 592 has been disengaged.

Upon receiving this detection signal from the photosensor 599, the controller 100 controls the sliding mechanism 652 to extend the hollow needle 153 in the main scanning direction. Specifically, the sliding mechanism 652 slides the hollow needle 153 from its retracted position to the ink delivery position shown in FIG. 15(*c*). As the hollow needle 153 is extended, the tip of the hollow needle 153 contacts the spherical member 52 and moves the spherical member 52 and the restricting member 594 rightward in FIG. 15. Since the locking member 592 is in the disengaged position at this time, the restricting member 594 is inserted through the hole 592*a* formed in the locking member 592, as shown in FIG. 15(*c*). The spherical member 52 separates from the sealing body 51, shifting the first valve 50 from the closed state to the open state. Consequently, ink in the ink bag 42 flows to the hollow needle 153 through the ink channel 546 formed in the ink-delivery tube 543, allowing ink to be supplied from the ink cartridge 540 to the inkjet head 2.

Next, operations performed when removing an ink cartridge 540 from the printer body will be described. To remove an ink cartridge 540 from the printer body, the operator opens the door 601*c* on the printer body. At this time, the door sensor 653 outputs a detection signal to the controller 100 indicating that the door 601*c* has been opened.

Upon receiving the detection signal from the door sensor 653, the controller 100 controls the sliding mechanism 652 to retract the hollow needle 153 in the main scanning direction. That is, the sliding mechanism 652 slides the hollow needle 153 from the ink delivery position to the retracted position. Accordingly, the hollow needle 153 is extracted through the slit 51*a*, allowing the spherical member 52 and restricting member 594 to move leftward in FIG. 15 by the urging force of the coil spring 53. Subsequently, the spherical member 52 contacts the curved part 51*b*, shifting the spherical member 52 to its closed state and extracting the restricting member 594 from the hole 592*a*. Also at this time, the controller 100 controls the actuator 580 to retract the rod-shaped member 581 in the main scanning direction. Accordingly, the rod-shaped member 581 is extracted through the opening 41*a* and is disengaged from the locking member 592. When the rod-shaped member 581 is disengaged from the locking member 592, the urging force of the coil spring 593 moves the locking member 592 to the locking position (i.e., the state shown in FIG. 15(*a*)). Note that between the time that the door 601*e* is beginning to be opened until the time that the door 601*c* is fully opened, the hollow needle 153 has completely moved into the retracted position and the rod-shaped member 581 and locking member 592 have completely disengaged. In this state, the operator can remove the ink cartridge 540 from the mounting unit 650 by pulling the ink cartridge 540 downward in FIG. 14.

Subsequently, the operator replaces the ink cartridge 540 just removed from the printer body with a new ink cartridge 540, mounting this new ink cartridge 540 in the printer body according to the procedure described above.

The inkjet printer 1 according to the fifth variation described above can obtain the same effects described in the fourth variation.

As a sixth variation of the preferred embodiment, the ink cartridge 40 described in the preferred embodiment may be mounted in the mounting unit 650 of the fifth variation. In other words, the mounting unit 150 described in the preferred embodiment may be replaced with the mounting unit 650. In the sixth variation of the embodiment, the actuator 180 is employed in place of the actuator 580 of the fifth variation. However, the contact 636 of the fifth variation is provided on the ink cartridge 40 in place of the contact 36. The contact 636 is disposed in a position for electrically connecting with the contact 661 when the ink cartridge 40 is mounted in the mounting unit 650. As with the contact 36 of the preferred embodiment, the contact 636 is electrically connected to the photosensor 99 and transfers a detection signal from the photosensor 99 to the controller 100 via the contact 661. The contact 639 of the fifth variation is also provided on the ink cartridge 40 next to the contact 636 in place of the contact 39 of the power input unit 38 in the preferred embodiment. The contact 639 is disposed at a position for electrically connecting with the contact 662 when the ink cartridge 540 is mounted in the mounting unit 650. The contact 639 is also electrically connected to the photosensor 99 for supplying power to the same when electrically connected to the contact 662.

Figure 16:
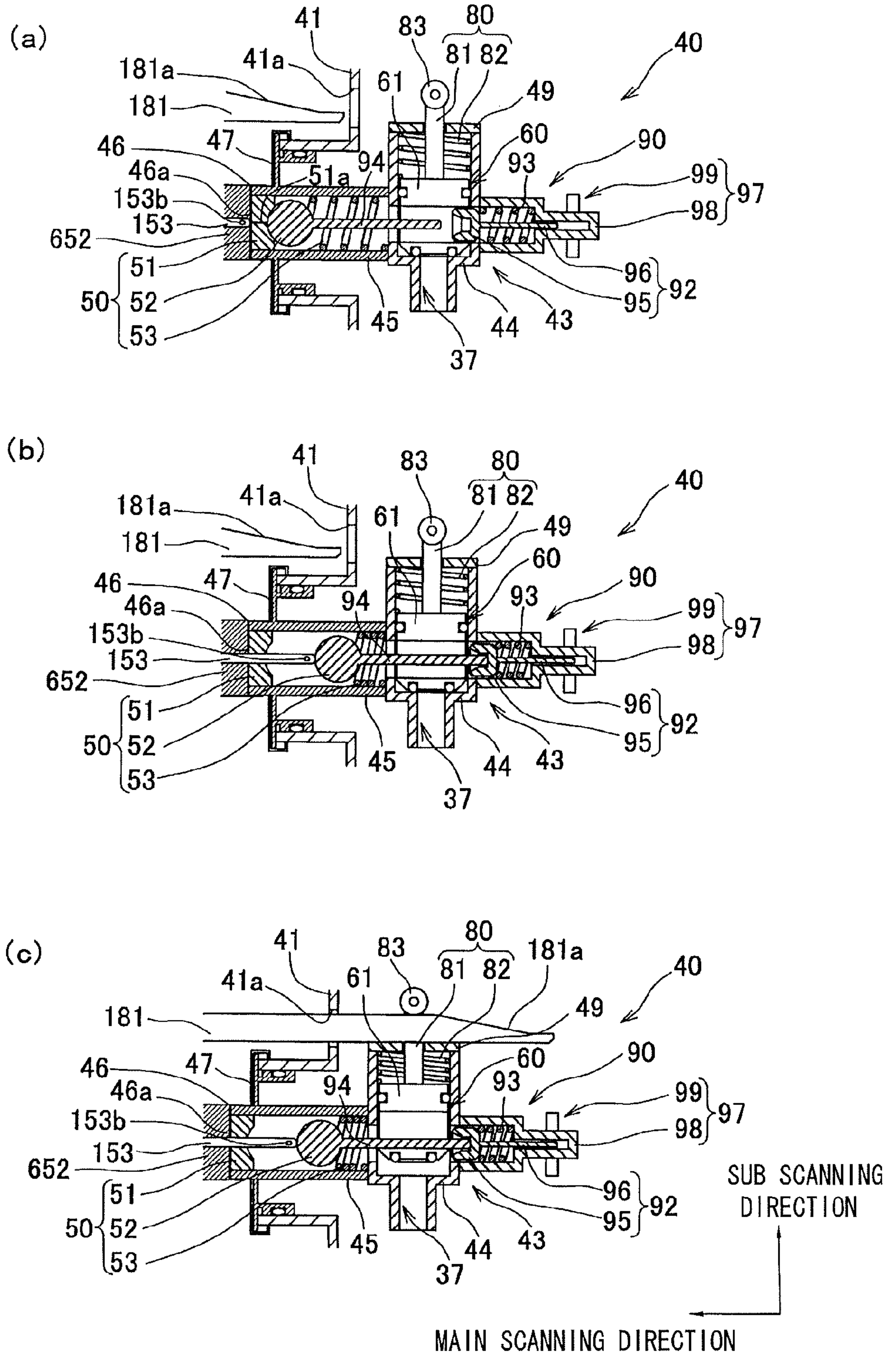

Next, the operations performed in the sixth variation when mounting the ink cartridge 40 in the printer body will be described with reference to FIG. 16. To mount the ink cartridge 40 in the printer body, the operator opens the door 601*c* on the printer body, inserts the ink cartridge 40 into the mounting unit 650, electrically connecting the contacts 636 and 661 and the contacts 639 and 662, and subsequently closes the door 601*c*. Through the electrical connection of the contacts 636 and 661, the controller 100 recognizes that an ink cartridge 40 is disposed in the prescribed position (fully mounted position). When the ink cartridge 40 is disposed in this prescribed position, the rod-shaped member 181 of the actuator 180 opposes the opening 41*a* in the main scanning direction and the hollow needle 153 opposes the slit 51*a* in the main scanning direction, as shown in FIG. 16(*a*). The door sensor 653 also outputs a detection signal to the controller 100 at this time indicating that the door 601*c* was closed.

Upon receiving the detection signal from the door sensor 653, the controller 100 controls the sliding mechanism 652 to extend the hollow needle 153 in the main scanning direction. Specifically, the sliding mechanism 652 slidingly moves the hollow needle 153 from the retracted position to the ink delivery position, as shown in FIG. 16(*b*). As the hollow needle 153 is extended, the distal end of the hollow needle 153 contacts the spherical member 52, moving the spherical member 52 and the pressing member 94 rightward in FIG. 16. As a result, the spherical member 52 separates from the sealing body 51, shifting the first valve 50 from its closed state to its open state, as shown in FIG. 16(*b*). Also at this time, the distal end of the pressing member 94 contacts the locking body 95, moving the locking body 95 from the locking position shown in FIG. 16(*a*) to the disengaged position shown in FIG. 16(*b*). When the locking body 95 arrives in the disengaged position, the distal end of the detection rod 96 arrives at a position within the translucent tube 98 confronting the photosensor 99. Accordingly, the photosensor 99 detects the detection rod 96 and outputs a detection signal to the controller 100 via the contacts 636 and 661 indicating that the locking mechanism 90 has unlocked the valve member 61.

Upon receiving the detection signal from the photosensor 99, the controller 100 controls the actuator 180 to extend the rod-shaped member 181 in the main scanning direction, as shown in FIG. 16(*c*). As the rod-shaped member 181 is extended, the distal end of the rod-shaped member 181 passes through the opening 41*a* and is inserted between the roller 83 and cover 49, forcing the roller 83 to move upward in FIG. 16 along the tapered portion 181*a* of the rod-shaped member 181. As the roller 83 moves upward, the valve member 61 moves upward in FIG. 16 from the closed position to the open position, shifting the second valve 60 from its closed state to its open state. At this time, ink inside the ink bag 42 can flow through the ink-delivery tube 43 to the hollow needle 153, thereby supplying ink from the ink cartridge 40 to the inkjet head 2.

Next, operations performed when removing an ink cartridge 40 from the printer body (from the mounting unit 650) will be described. To remove an ink cartridge 40 from the printer body, the operator first opens the door 601*c*. As a result, the door sensor 653 outputs a detection signal to the controller 100 indicating that the door 601*c* was opened.

Upon receiving this detection signal from the door sensor 653, the controller 100 controls the actuator 180 to retract the rod-shaped member 181 in the main scanning direction. Through this operation, the rod-shaped member 181 is withdrawn through the opening 41*a* and disengaged from the roller 83, allowing the valve member 61 to move into the closed position. Consequently, the second valve 60 shifts from the open state to the closed state, interrupting communication between the ink channels 37*a* and 37*b*. At the same time, the controller 100 controls the sliding mechanism 652 to retract the hollow needle 153 in the main scanning direction. Thus, the hollow needle 153 is moved from the ink delivery position to the retracted position. As the hollow needle 153 is withdrawn from the slit 51*a*, the spherical member 52 and the pressing member 94 move leftward in FIG. 16 and the spherical member 52 comes into contact with the curved part 51*b*, shifting the first valve 50 into the closed state. Further, when the second valve 60 shifts to the closed state, the urging force of the coil spring 93 moves the locking member 92 from the disengaged position to the locking position (see FIG. 16(*a*)). Accordingly, the locking body 95 locks the valve member 61 to prevent the second valve 60 from switching from the closed state back to the open state.

Thereafter, the operator replaces the ink cartridge 40 that was just removed from the printer body with a new ink cartridge 40, mounting the new ink cartridge 40 in the printer body according to the procedure described above.

The inkjet printer 1 according to the sixth variation of the embodiment can obtain the same effects described in the fifth variation.

Figure 17:
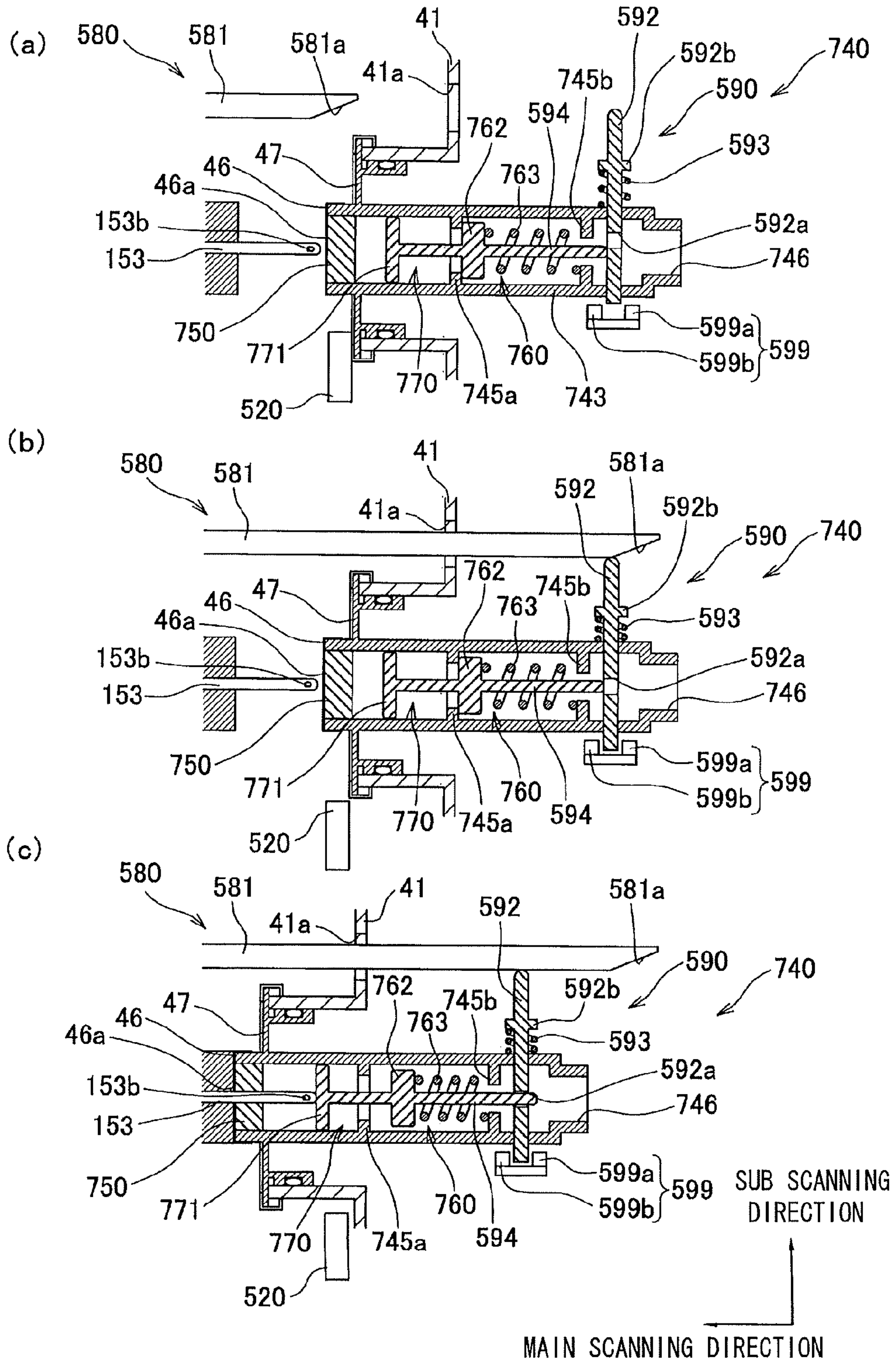

FIG. 17 shows an ink cartridge 740 according to a seventh variation of the preferred embodiment. As shown in FIG. 17, the ink cartridge 740 is provided with a first valve 750 and a second valve 760 in place of the first valve 50 provided in the ink cartridge 540 according to the fourth variation.

The ink cartridge 740 according to the seventh variation has an ink-delivery tube 743 extending in the main scanning direction. An ink channel 746 is formed in the ink-delivery tube 743. The first valve 750 is provided on one end of the ink-delivery tube 743, and the ink bag 42 is connected to the other end. The first valve 750 is configured only of a sealing body for sealing the opening in the end of the ink-delivery tube 743. Hence, this construction reduces the number of parts required for the first valve. The sealing body is formed of the same material as the sealing body 51 described in the preferred embodiment.

The first time the hollow needle 153 is inserted into the sealing body 750 according to the seventh variation, the sealing body 750 constituting the first valve is switched to an open state when the hollow needle 153 has penetrated the sealing body 750 (i.e., when the distal end of the hollow needle 153 has passed through the edge of the sealing body 750 on the right side in FIG. 17). However, if the hollow needle 153 is subsequently pulled out of the sealing body 750 and then reinserted, the sealing body 750 switches to the open state as soon as the distal end of the hollow needle 153 is inserted into the sealing body 750 (i.e., when the distal end of the hollow needle 153 passes through the edge of the sealing body 750 on the left side in FIG. 17). The sealing body 750 enters the open state at this time because a through-hole was formed in the sealing body 750 when the hollow needle 153 was first inserted. When the hollow needle 153 is pulled out of the sealing body 750, the elastic restoring force of the sealing body 750 closes the through-hole formed therein, shifting the sealing body 750 into a closed state. When the hollow needle 153 is once again inserted into the sealing body 750, the closed through-hole is opened when the tip of the hollow needle 153 is inserted therein, shifting the sealing body 750 into its open state.

Two annular protrusions 745*a* and 745*b* are formed on the inner surface of the ink-delivery tube 743. The annular protrusions 745*a* and 745*b* are spaced apart in the main scanning direction and protrude inward. The second valve 760 is disposed between the annular protrusions 745*a* and 745*b*.

The second valve 760 includes a valve member 762 and a coil spring 763. The valve member 762 has a columnar shape and can slide along the inner surface of the ink-delivery tube 743. Gaps are partially formed between the side surfaces of the valve member 762 and the inner surface of the ink-delivery tube 743. Hence, when the valve member 762 is not in contact with the annular protrusion 745*a*, the valve member 762 does not hinder the flow of ink in the ink channel 746. The restricting member 594 described in the fourth variation is provided on the valve member 762. The locking mechanism 590 in the seventh variation can prevent the second valve 760 from switching from the closed state to the open state.

One end of the coil spring 763 contacts the valve member 762, while the other end contacts the annular protrusion 745*b*. The coil spring 763 constantly urges the valve member 762 toward the annular protrusion 745*a*. In other words, the coil spring 763 urges the valve member 762 in a direction toward the sealing body 750. By contacting the annular protrusion 745*a*, as shown in FIG. 17(*a*), the valve member 762 interrupts communication in the ink channel 746, i.e., interrupts the flow of ink in the ink channel 746, and places the second valve 760 in the closed state. Further, since the coil spring 763 urges the valve member 762 toward the sealing body 750 and since the elements constituting the first and second valves 750 and 760 are aligned in the main scanning direction, the sealing body 750 and second valve 760 can be opened and closed by the insertion and removal of the hollow needle 153 with respect to the sealing body 750. Further, the second valve 760 can be configured through a simple construction that reduces malfunctions. Here, an urging member other than a coil spring may be used in place of the coil spring 763.

A pressing member 770 is also disposed inside the ink-delivery tube 743. The pressing member 770 moves the valve member 762 against the urging force of the coil spring 763 when the hollow needle 153 is inserted through the sealing body 750. The pressing member 770 is rod-shaped and extends in the main scanning direction. The pressing member 770 is integrally formed with the valve member 762 on the end opposing the annular protrusion 745*a*. An enlarged diameter part 771 is formed on the distal end of the pressing member 770. The enlarged diameter part 771 has a slightly smaller diameter than the inner diameter of the ink-delivery tube 743. The enlarged diameter part 771 enables the distal end of the hollow needle 153 to contact the pressing member 770 reliably, as shown in FIG. 17(*c*). Note that the inner dimension of the ink-delivery tube 743 according to the seventh variation in the direction orthogonal to the main scanning direction and sub scanning direction is larger than that of the enlarged diameter part 771, allowing ink flow between the enlarged diameter part 771 and the walls of the ink-delivery tube 743.

As shown in FIG. 17(*a*), a gap is formed between the enlarged diameter part 771 of the pressing member 770 and the sealing body 750, even when the hollow needle 153 has not yet been inserted through the sealing body 750. Accordingly, the second valve 760 switches to the open state after the sealing body 750 has been placed in its open state.

However, after the hollow needle 153 has been inserted and both the sealing body 750 and second valve 760 have been shifted to their open states, the second valve 760 is first to switch to its closed state when the hollow needle 153 is withdrawn. The sealing body 750 switches to its closed state only when the hollow needle 153 has been completely removed from the sealing body 750.

Next, operations performed when mounting the ink cartridge 740 according to the seventh variation into the printer body of the fourth variation will be described with reference to FIG. 17. As in the fourth variation, when mounting an ink cartridge 740 in the printer body, the operator first opens the door 1*c* on the printer body, inserts the ink cartridge 740 into the mounting unit 150, and then closes the door 1*c*. When the operator closes the door 1*c*, the urging mechanism 550 (see FIG. 13(*b*)) is urging the ink cartridge 740 toward the mounting unit 150 while the ink cartridge 740 is in contact with the stopper 520, as shown in FIG. 17(*a*). At this time, the contact 163 of the power output unit 162 is connected to the contact 39 of the power input unit 38, whereby power is supplied to the photosensor 599. The contacts 36 and 161 are also electrically connected, providing an electrical connection between the controller 100 and photosensor 599.

When the contacts 36 and 161 become electrically connected, the controller 100 controls the actuator 580 to extend the rod-shaped member 581 in the main scanning direction, as shown in FIG. 17(*b*). The extended rod-shaped member 581 moves the locking member 592 from the locking position to the disengaged position. Consequently, the photosensor 599 detects the locking member 592 and outputs a detection signal to the controller 100 indicating that the locking member 592 has been disengaged.

Upon receiving the detection signal from the photosensor 599, the controller 100 controls the moving mechanism to move the stopper 520 from the restricting position to the non-restricting position. Hence, the ink cartridge 740 is automatically inserted into the mounting unit 150 by the urging force of the urging mechanism 550. At the same time, the hollow needle 153 penetrates the sealing body 750, switching the sealing body 750 to the open state, as shown in FIG. 17(*c*). Subsequently, the distal end of the hollow needle 153 contacts the enlarged diameter part 771, moving the pressing member 770 and valve member 762 rightward in FIG. 17. Since the locking member 592 is in the disengaged position at this time, the restricting member 594 is inserted through the hole 592*a*, as shown in FIG. 17(*c*). Next, the valve member 762 separates from the annular protrusion 745*a*, switching the second valve 760 from the closed state to the open state. Consequently, ink accommodated in the ink bag 42 flows into the hollow needle 153 through the ink channel 746 formed in the ink-delivery tube 743, enabling ink to be supplied from the ink cartridge 740 to the inkjet head 2.

Next, operations performed when removing the ink cartridge 740 from the printer body will be described. To remove the ink cartridge 740 from the printer body, the operator opens the door 1*c* on the printer body and pulls the ink cartridge 740 out of the mounting unit 150. As the ink cartridge 740 is moving out of the mounting unit 150, the hollow needle 153 is extracted from the sealing body 750. As the hollow needle 153 is extracted, the pressing member 770, valve member 762, and restricting member 594 move leftward in FIG. 17 until the valve member 762 contacts the annular protrusion 745*b*. Consequently, the sealing body 750 and the second valve 760 are shifted from the open state to the closed state, and the restricting member 594 is extracted from the hole 592*a*.

As the ink cartridge 740 is further removed from the mounting unit 150, the contacts 163 and 39 are disconnected and the contacts 36 and 161 are disconnected. At this time, as in the fourth variation described above, the controller 100 controls the actuator 580 to retract the rod-shaped member 581 in the main scanning direction a prescribed time (10 seconds, for example) after the contacts 36 and 161 are disconnected. When the actuator 580 is retracted, the rod-shaped member 581 is withdrawn through the opening 41*a* and is disengaged from the locking member 592. When the user moves the ink cartridge 740 in the direction for removing the ink cartridge 740 from the mounting unit 150 at this time, this movement also extracts the rod-shaped member 581 from the opening 41*a* and disengages the rod-shaped member 581 from the locking member 592. When the rod-shaped member 581 is disengaged from the locking member 592, the urging force of the coil spring 593 moves the locking member 592 into the locking position (i.e., the state shown in FIG. 17(*a*)).

The controller 100 also controls the moving mechanism at the same timing as the actuator 580 to move the stopper 520 from the non-restricting position to the restricting position. Since the ink cartridge 740 has already passed the position of contact with the stopper 520 when the stopper 520 is moved into the restricting position, the stopper 520 does not contact the ink cartridge 740. Thereafter, the operator replaces the ink cartridge 740 just removed from the printer body with a new ink cartridge 740, mounting this new ink cartridge 740 into the printer body according to the procedure described above.

The ink cartridge 740 according to the seventh variation described above can suppress large quantities of ink leakage when removed from the printer body, even if the sealing body 750 is damaged, because the locking mechanism 590 locks the second valve 760 in its closed state. The inkjet printer according to the seventh variation includes the ink cartridge 740 having the effects described above. The printer moves the second valve 760 into its open state after first unlocking the second valve 760, thereby preventing damage to the second valve 760 and locking mechanism 590 that could be occur when attempting to move the second valve 760 in its locked state and further preventing ink leakage that could be caused by some damage. Since the locking mechanism 590 locks the second valve 760 in its closed state when the ink cartridge 740 is removed from the printer body, the locking mechanism 590 prevents the valve member 762 from moving and opening the second valve 760 due to impacts occurring when the ink cartridge 740 is transported. The inkjet printer 1 according to the seventh variation can obtain the same effects described in the preferred embodiment and the first through sixth variations thereof attributed to similar structures.

While the invention has been described in detail with reference to specific embodiments thereof, it would be apparent to those skilled in the art that many modifications and variations may be made therein without departing from the spirit of the invention, the scope of which is defined by the attached claims. For example, the valve may possess a structure other than those described in the preferred embodiment and variations thereof. The locking mechanism may also have a structure different from the embodiment and its variations. The detection unit 97 may also be omitted from the structure of the ink cartridge described in the preferred embodiment. Alternatively, the sensor 170 may be used in place of the detection unit 97 to detect when the second valve 60 is unlocked. Further, the cartridge may accommodate a liquid other than ink, such as a liquid required for maintenance. It is also possible to eliminate the urging member used to urge the locking member toward its locking position from the structure of the preferred embodiment. For example, rather than providing the coil spring 593 in the ink cartridge 540 shown in FIG. 12, the contact pressure between the locking member 592 and its O-rings may be set higher to maintain the locking member 592 in its locking position.

What is claimed is:

1. A liquid cartridge comprising:
a cartridge body, the cartridge body comprising:
a liquid accommodating unit configured to accommodate liquid;
a delivery channel configured to discharge the liquid outside, the delivery channel being in fluid communication with the liquid accommodating unit;
a valve comprising a valve body provided in the delivery channel, the valve body being configured to selectively move between a closed position where the delivery channel is closed and an open position where the delivery channel is open; and
a locking mechanism comprising a locking member configured to selectively move between a locking position where the locking mechanism locks the valve body in the closed position and a disengaged position wherein the locking mechanism allow the valve body positioned at the closed position to move to the open position.

2. The liquid cartridge according to claim 1, wherein the valve body is moved from the closed position to the open position in a first direction, and the locking member is moved from the locking position to the disengaged position in a second direction orthogonal to the first direction.

3. The liquid cartridge according to claim 1, further comprising an auxiliary valve provided in the delivery channel,
wherein the delivery channel has a one end portion in fluid communication with the liquid accommodating unit and another end portion formed with an outlet, the auxiliary valve being disposed closer to the outlet than the valve,
wherein the auxiliary valve is configured to selectively move between a closed state where the delivery channel is closed and an open state where the delivery channel is open.

4. The liquid cartridge according to claim 1, wherein the valve further comprises a first urging member configured to urge the valve body from the open position toward the closed position so as to locate the valve body at the closed position,
wherein the lock mechanism further comprises a second urging member configured to urge the locking member from the disengaged position toward the locking position so as to locate the locking member at the locking position.

5. The liquid cartridge according to claim 4, further comprising a sensor configured to output a signal depending on the position of the locking member.

6. A liquid-ejecting device comprising:
the liquid cartridge according to claim 4; and
an ejecting body configured to receive the liquid cartridge and comprising an ejecting unit configured to eject the liquid discharged from the delivery channel,
wherein the ejecting body comprises:

a cartridge maintaining unit configured to receive the liquid cartridge from outside and maintain the liquid cartridge at a fully mounted position where the liquid cartridge is completely mounted in the cartridge maintaining unit;

a first moving member configured to be inserted within the liquid cartridge, the first moving member inserted within the liquid cartridge moving the locking member positioned at the locking position by the second urging member to the disengaged position in conjunction with mount of the liquid cartridge to the cartridge maintaining unit; and a second moving member configured to be inserted within the liquid cartridge which has been mounted at the fully mounted position, the second moving member inserted within the liquid cartridge moving the valve body positioned at the closed position by the first urging member to the open position.

7. The liquid-ejecting device according to claim 6, wherein the liquid cartridge further comprises a sensor configured to detect the position of the locking member, wherein the ejecting body further comprises a control unit configured to control the second moving member and receive a signal outputted from the sensor of the liquid cartridge, wherein the control unit controls the second moving member to be inserted within the liquid cartridge in the fully mounted position when the sensor detects that the locking member is in the disengaged position.

8. A liquid-ejecting device comprising:

the liquid cartridge according to claim 4; and an ejecting body configured to receive the liquid cartridge and comprising an ejecting unit configured to eject the liquid discharged from the delivery channel, wherein the ejecting body comprises:

a cartridge maintaining unit configured to receive the liquid cartridge from outside and maintain the liquid cartridge at a fully mounted position where the liquid cartridge is completely mounted in the cartridge maintaining unit, a stopper configured to maintain the liquid cartridge at a midway position different from the fully mounted position, the liquid cartridge being halfway mounted on the cartridge maintaining unit at the midway position, the stopper being configured to selectively move between a restricting position where the liquid cartridge is prevented from being positioned at the full mounted position and an allowing position where the liquid cartridge is allowed to be positioned at the full mounted position;

a first moving member configured to be inserted within the liquid cartridge maintained at the midway position by the stopper, the first moving member inserted within the liquid cartridge moving the locking member positioned at the locking position by the second urging member to the disengaged position; and a second moving member configured to be inserted within the liquid cartridge, the second moving member inserted within the liquid cartridge moving the valve body positioned at the closed position by the first urging member to the open position in conjunction with the movement of the liquid cartridge from the midway position to the fully mounted position.

9. The liquid-ejecting device according to claim 8, wherein the liquid cartridge further comprises a sensor configured to detect the position of the locking member, wherein the ejecting body further comprises a control unit configured to control the stopper and receive a signal outputted from the sensor of the liquid cartridge positioned at the midway position, wherein the control unit controls the stopper such that the liquid cartridge moves from the midway position to the fully mounted position when the sensor detects that the locking member is in the disengaged position.

10. A liquid-ejecting device comprising:

the liquid cartridge according to claim 4; and an ejecting body configured to receive the liquid cartridge and comprising an ejecting unit configured to eject the liquid discharged from the delivery channel, wherein the ejecting body comprises:

a cartridge maintaining unit configured to receive the liquid cartridge from outside and maintain the liquid cartridge at a fully mounted position where the liquid cartridge is completely mounted in the cartridge maintaining unit;

a first moving member configured to be inserted within the liquid cartridge maintained at the fully mounted position, the first moving member moving the locking member positioned at the locking position by the second urging member to the disengaged position; and a second moving member configured to be inserted within the liquid cartridge maintained at the fully mounted position, the second moving member inserted within the liquid cartridge moving the valve body positioned at the closed position by the first urging member to the open position.

11. The liquid-ejecting device according to claim 10, wherein the liquid cartridge further comprises a sensor configured to detect the position of the locking member, wherein the ejecting body further comprises a control unit configured to control the second moving member and receive a signal outputted from the sensor of the liquid cartridge, wherein the control unit controls the second moving member to be inserted within the liquid cartridge maintained at the fully mounted position when the sensor detects that the locking member is in the disengaged position.

* * * * *